US012704720B2

(12) United States Patent
Kim et al.

(10) Patent No.: US 12,704,720 B2
(45) Date of Patent: Aug. 11, 2026

(54) DISPLAY PANEL, DISPLAY DEVICE, AND CONTROL METHOD OF DISPLAY DEVICE

(71) Applicant: Samsung Display Co., LTD., Yongin-si (KR)

(72) Inventors: Sang Ho Kim, Gwangmyeong-si (KR); Soo Min Baek, Hwaseong-si (KR); Ji Won Lee, Suwon-si (KR); Cheon Myeong Lee, Seoul (KR); Ju Hwa Ha, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 148 days.

(21) Appl. No.: 17/528,146

(22) Filed: Nov. 16, 2021

(65) Prior Publication Data

US 2022/0221721 A1 Jul. 14, 2022

(30) Foreign Application Priority Data

Jan. 8, 2021 (KR) ........................ 10-2021-0002255

(51) Int. Cl.
*G02B 27/00* (2006.01)
*G02B 27/01* (2006.01)
(Continued)

(52) U.S. Cl.
CPC ..... *G02B 27/0172* (2013.01); *G02B 27/0093* (2013.01); *G02B 27/1066* (2013.01);
(Continued)

(58) Field of Classification Search
CPC ............ G02B 27/0172; G02B 27/0179; G02B 27/0093; G02B 2027/0138;
(Continued)

(56) References Cited

U.S. PATENT DOCUMENTS 6,449,309 B1 * 9/2002 Tabata ................. H04N 13/344 348/E13.047
9,380,287 B2 6/2016 Nistico et al.
(Continued)

FOREIGN PATENT DOCUMENTS

CN 106199962 A 12/2016
CN 110651236 A 1/2020
(Continued)

*Primary Examiner* — Lunyi Lao
*Assistant Examiner* — Jarurat Suteerawongsa
(74) *Attorney, Agent, or Firm* — CANTOR COLBURN LLP

(57) ABSTRACT

A display device includes a display unit including a first surface through which light is emitted, a second surface opposite to the first surface, and a plurality of transmissive regions which transmits infrared light incident on the first surface; a first lens and a second lens disposed on the first surface of the display unit, where a plurality of channels, through which the light emitted from the first surface of the display unit passes, is defined in the first lens and the second lens; a plurality of infrared light sources disposed on the first surface of the display unit, where the plurality of infrared light sources emits infrared light; and a plurality of infrared cameras disposed on the second surface of the display unit to overlap the transmissive regions.

5 Claims, 19 Drawing Sheets

(51) Int. Cl.
*G02B 27/10* (2006.01)
*H04N 23/20* (2023.01)

(52) U.S. Cl.
CPC ..... *H04N 23/20* (2023.01); *G02B 2027/0138* (2013.01); *G02B 2027/0178* (2013.01)

(58) Field of Classification Search
CPC ...... G02B 2027/0187; G02B 2027/014; G02B 3/0037; G02B 27/1066; G02B 2027/0178; G02B 17/086; G02B 27/00; H04N 13/254; H04N 13/344; H04N 13/383; H04N 5/33; H04N 23/20; H10K 59/00; H10K 59/12; H10K 59/50; H10K 59/65; H10K 59/80
See application file for complete search history.

(56) References Cited

U.S. PATENT DOCUMENTS 9,798,146 B2 10/2017 Yang
10,197,807 B2 2/2019 Yang
10,546,518 B2 1/2020 Perreault et al.
10,607,075 B2 3/2020 Gustafsson et al.
10,672,841 B2 6/2020 Kim et al.
10,816,810 B1 10/2020 Choi et al.
11,189,669 B2 11/2021 Kim et al.
11,520,152 B1 * 12/2022 Lau .................... G02B 27/0172
2004/0140960 A1 * 7/2004 Cok ....................... H10K 59/40 345/175
2012/0162490 A1 6/2012 Chung et al.
2012/0327197 A1 * 12/2012 Yamashita .............. G06T 7/593 348/E13.074
2013/0155176 A1 * 6/2013 Paripally ................ H04N 7/144 348/14.07
2013/0258234 A1 * 10/2013 Park .................. G02F 1/133528 349/58
2013/0286053 A1 * 10/2013 Fleck ..................... G09G 5/377 345/82
2016/0246055 A1 * 8/2016 Border ............... G02B 27/0172
2017/0115432 A1 * 4/2017 Schmidtlin .......... G02B 3/0056
2017/0205877 A1 * 7/2017 Qin .................... G02B 27/0093
2017/0287992 A1 * 10/2017 Kwak ................... G06F 1/1652
2018/0003862 A1 * 1/2018 Benitez .................. G02B 30/24
2018/0113508 A1 * 4/2018 Berkner-Cieslicki ........................ G06T 7/292
2018/0330652 A1 * 11/2018 Perreault ................... G06T 3/40
2019/0162955 A1 * 5/2019 Jang ................... G02B 27/0955
2020/0273426 A1 8/2020 Gollier et al.
2020/0355929 A1 * 11/2020 Zhang .................. G02B 27/425

FOREIGN PATENT DOCUMENTS

CN 111796420 A 10/2020
KR 1020160022927 A 3/2016
KR 20180056446 A 5/2018
WO 2015077718 A1 5/2015

* cited by examiner

FIG. 9

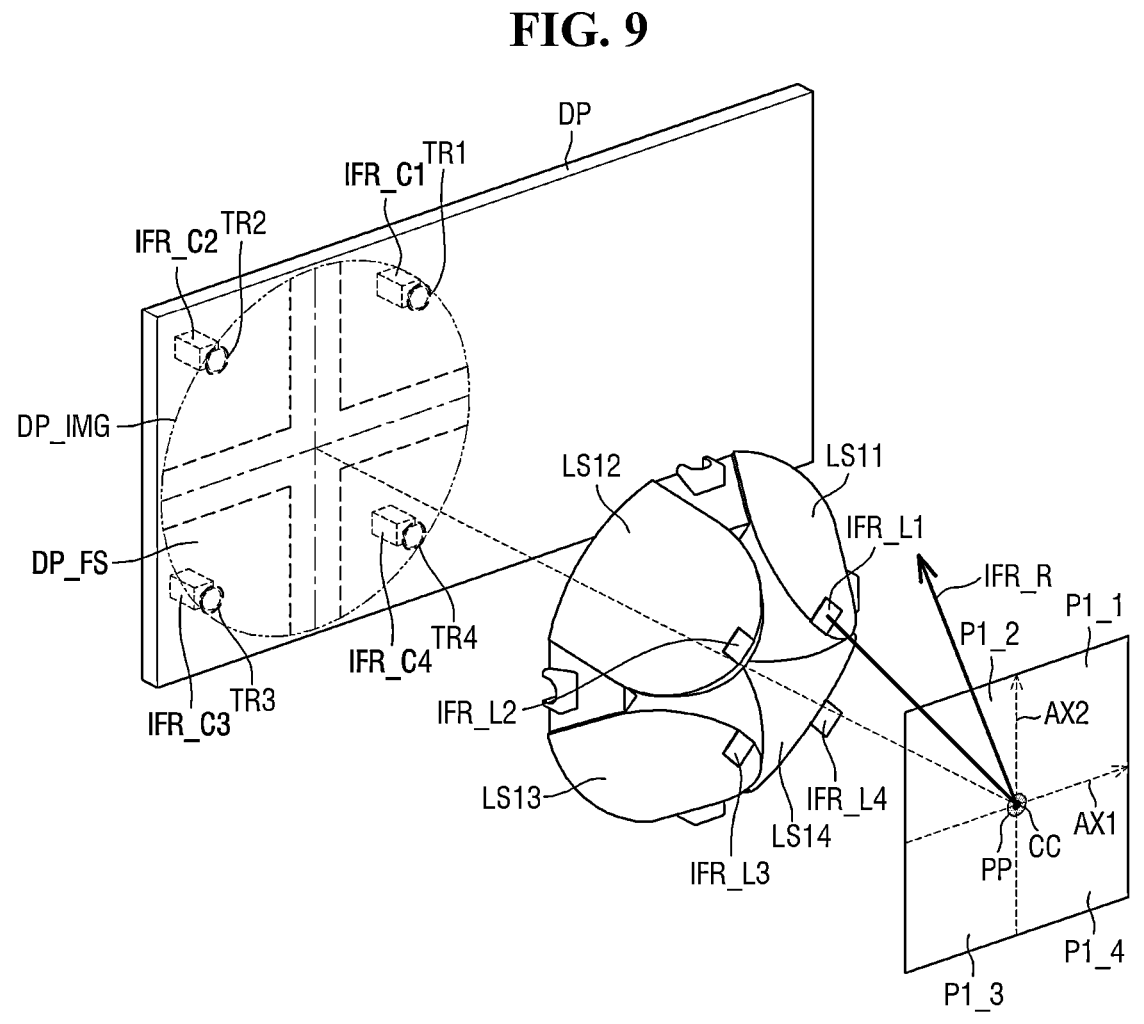

DP
IFR_C1
TR1
IFR_C2
TR2
DP_IMG
DP_FS
IFR_C3
TR3
IFR_C4
TR4
LS12
LS11
IFR_L1
IFR_R
P1_1
P1_2
AX2
IFR_L2
LS13
IFR_L4
LS14
IFR_L3
AX1
CC
PP
P1_4
P1_3

FIG. 19

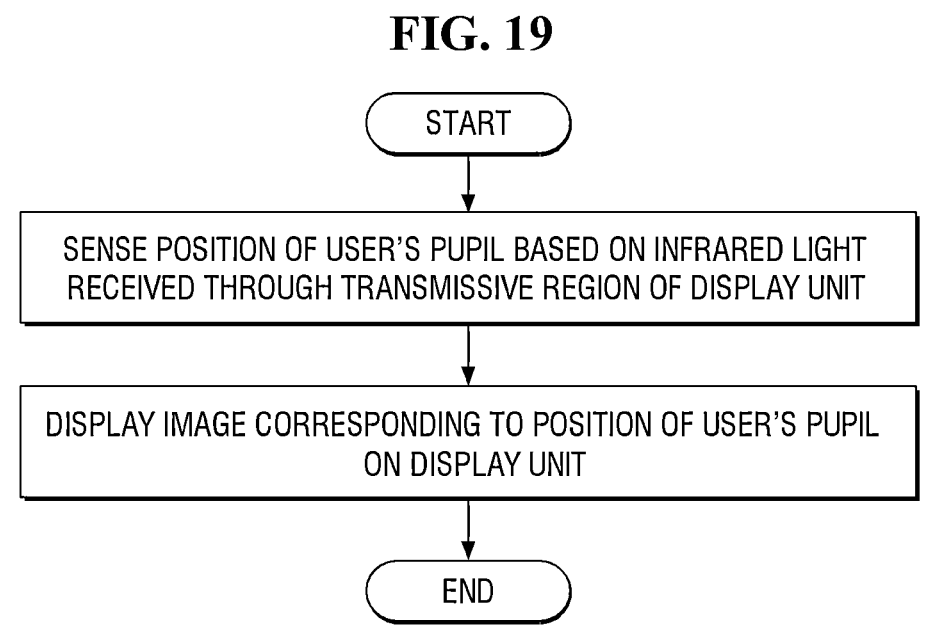

START

SENSE POSITION OF USER'S PUPIL BASED ON INFRARED LIGHT RECEIVED THROUGH TRANSMISSIVE REGION OF DISPLAY UNIT

DISPLAY IMAGE CORRESPONDING TO POSITION OF USER'S PUPIL ON DISPLAY UNIT

END

DISPLAY PANEL, DISPLAY DEVICE, AND CONTROL METHOD OF DISPLAY DEVICE

This application claims priority to Korean Patent Application No. 10-2021-0002255, filed on Jan. 8, 2021, and all the benefits accruing therefrom under 35 U.S.C. § 119, the content of which in its entirety is herein incorporated by reference.

BACKGROUND

1. Field

The disclosure relates to a display panel, a display device, and a control method of the display device.

2. Description of the Related Art

Recently, electronic devices including display devices are provided in a form that can be worn on a body. Such electronic devices are commonly referred to as wearable electronic devices. The wearable electronic devices may be directly worn on the body, thereby improving portability and user accessibility.

The wearable electronic devices may include a head mounted electronic device, e.g., a head mount display ("HMD") device that may be mounted on a head portion or a head of a wearer. The HMD device may be generally classified into a see-through type for providing the augmented reality ("AR") and a see-closed type for providing the virtual reality ("VR").

SUMMARY

Embodiments of the disclosure provides a display panel, a display device, and a control method of the display device for implementing a device having a slim thickness.

An embodiment of a display device includes a display unit including a first surface through which light is emitted, a second surface opposite to the first surface, and a plurality of transmissive regions which transmits infrared light incident on the first surface; a first lens and a second lens disposed on the first surface of the display unit, where a plurality of channels, through which the light emitted from the first surface of the display unit passes, is defined in the first lens and the second lens; a plurality of infrared light sources disposed on the first surface of the display unit, where the plurality of infrared light sources emits infrared light; and a plurality of infrared cameras disposed on the second surface of the display unit to overlap the plurality of transmissive regions.

An embodiment of a display panel in a head mounted display includes a substrate; a plurality of conductive layers disposed on the substrate; a plurality of insulating layers insulating the plurality of conductive layers from each other; and a transmissive region which transmits at least a part of light incident on the display panel and disposed to overlap a sensor which detects a position of a user's pupil, where the transmissive region includes a transmissive hole defined through at least one selected from the plurality of conductive layers and the plurality of insulating layers.

An embodiment of a control method of a display device includes detecting a position of a user's pupil based on infrared light, which is reflected from the user's pupil and received through a plurality of transmissive regions of a display unit; and displaying a display image corresponding to the position of the user's pupil on the display unit.

BRIEF DESCRIPTION OF THE DRAWINGS

The above and other features of the disclosure will become more apparent by describing in detail embodiments thereof with reference to the attached drawings, in which:

FIG. 9 is a view illustrating a case in which a user's pupil is positioned at an origin;

FIG. 19 is a flowchart of a control method of the display device according to an embodiment.

DETAILED DESCRIPTION

Figure 1:
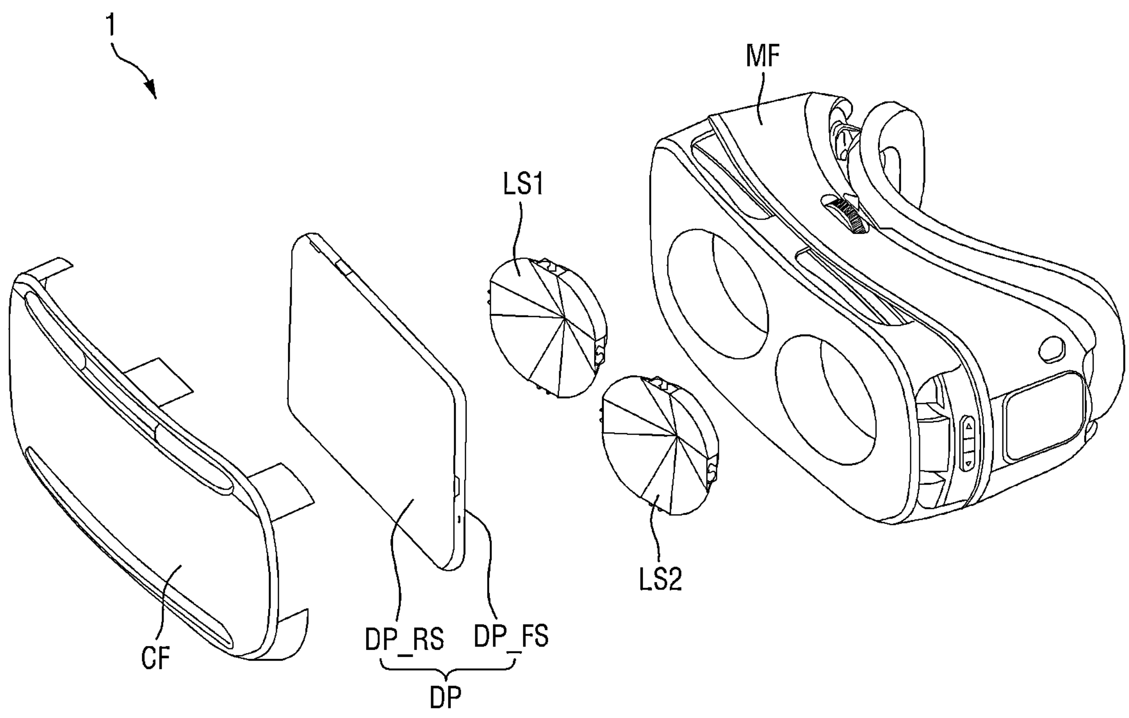
FIG. 1 is a perspective view of a display device according to an embodiment.

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a perspective view of a display device according to an embodiment.

An embodiment of the display device 1 may be a head mounted display device that is mounted on a user's head and provides a screen on which an image or a video is displayed to a user.

The head mounted display device may be a see-through type head mounted display device that provides the augmented reality based on actual external objects, or a see-closed type head mounted display device that provides the virtual reality to a user with a screen independent from external objects. Hereinafter, for convenience of description, embodiments where the display device 1 is the see-closed type head mounted display device will be described in detail, but the disclosure is not limited thereto.

Referring to FIG. 1, an embodiment of the display device 1 may include a main frame MF, a display unit DP, a multi-channel lens LS, and a cover frame CF.

The main frame MF may be worn on the user's face. The main frame MF may have a shape corresponding to a shape of the user's head (or face). A first lens LS1, a second lens LS2, the display unit DP, and the cover frame CF may be disposed or mounted on the main frame MF. The main frame MF may include a structure defining a space in which the display unit DP, the first lens LS1, and the second lens LS2 may be accommodated. Although not shown in the drawing, the main frame MF may further include a structure such as a strap or a band to facilitate mounting, and a control unit, an image processing unit, and a lens accommodating unit may be further mounted on the main frame MF.

The display unit DP may display an image and/or a video. The display unit DP may include a front surface DP_FS on which the image and/or the video is displayed and a rear surface DP_RS opposite to the front surface DP_FS. Light for providing the image and/or the video may be emitted from the front surface DP_FS of the display unit DP. As described later, the first lens LS1 and the second lens LS2 may be disposed on the front surface DP_FS of the display unit DP, and a plurality of infrared cameras IFR_C1, IFR_C2, IFR_C3, IFR_C4, IFR_C5, IFR_C6, IFR_C7, and IFR_C8 may be disposed on the rear surface DP_RS of the display unit DP.

The display unit DP may be detachably fixed to the main frame MF. The display unit DP may be configured to be opaque, transparent, or translucent according to a design of the display device 1, for example, a type of the display device 1.

The display unit DP may include an electronic component such as a display module including a display panel to be described later, or may be a display device such as a mobile terminal including a display panel, but the disclosure is not limited thereto.

The display unit DP may include a display panel for displaying an image or a video.

The display panel DP may be a light-emitting display panel including a light-emitting element. In one embodiment, for example, a display panel 300 may be an organic light-emitting display panel using an organic light-emitting diode ("LED") including an organic light-emitting layer, a micro LED display panel using a micro LED, a quantum dot light-emitting display panel using a quantum dot LED including a quantum dot light-emitting layer, or an inorganic light-emitting display panel using an inorganic light-emitting element including an inorganic semiconductor. Hereinafter, for convenience of description, embodiments where the display panel DP is an organic light-emitting display panel will be described in detail, but the disclosure is not limited thereto.

The multi-channel lens LS may pass light emitted from the display unit DP to provide the light to the user. The multi-channel lens LS may provide a plurality of channels for passing the light emitted from the display unit DP. The plurality of channels may pass the light emitted from the display unit DP through different paths to provide the light to the user. The light emitted from the display unit DP may be incident on each of the channels so that an enlarged image may be focused on the user's eyes.

In an embodiment, as shown in FIG. 1, the multi-channel lens LS may include the first lens LS1 and the second lens LS2.

The first lens LS1 and the second lens LS2 may be disposed on the front surface DP_FS of the display unit DP. The first lens LS1 and the second lens LS2 may be arranged on the front surface DP_FS of the display unit DP corresponding to positions of the user's left and right eyes. The first lens LS1 and the second lens LS2 may be accommodated in the main frame MF.

The first lens LS1 and the second lens LS2 may reflect and/or refract light for providing an image and/or a video displayed on the display unit DP to the user. As described later, a plurality of infrared light sources (see "IFR_L1, IFR_L2, IFR_L3, IFR_L4, IFR_L5, IFR_L6, IFR_L7, IFR_L8" in FIG. 2) may be disposed at one side of (or on a first surface of) each of the first lens LS1 and the second lens LS2 facing the main frame MF (the user's eyes).

The cover frame CF may be disposed on the rear surface DP_RS of the display unit DP to protect the display unit DP. The plurality of infrared cameras to be described later (see "IFR_C1, IFR_C2, IFR_C3, IFR_C4, IFR_C5, IFR_C6, IFR_C7, IFR_C8" in FIGS. 4 and 5) may be interposed between the cover frame CF and the display unit DP, but the disclosure is not limited thereto.

Although not shown in the drawing, the display device 1 may further include a control unit for controlling an overall operation of the display device 1.

Figure 2:
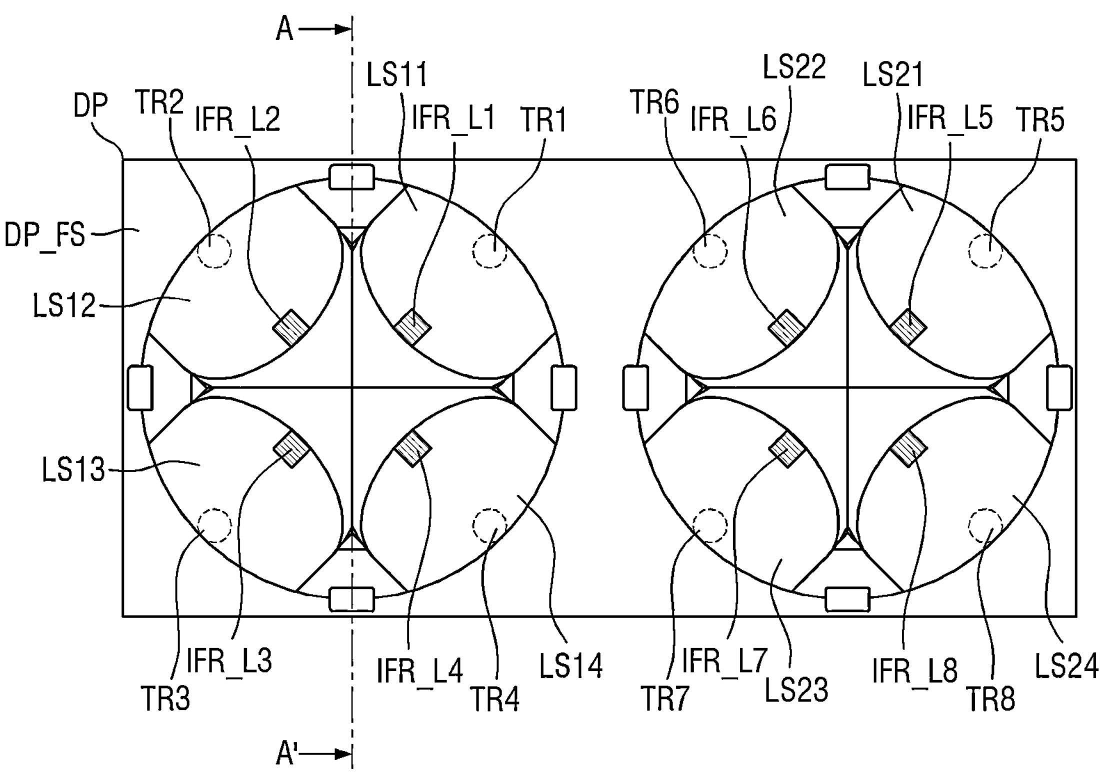
FIG. 2 is a plan view of a plurality of lenses and a display unit according to an embodiment.
Figure 4:
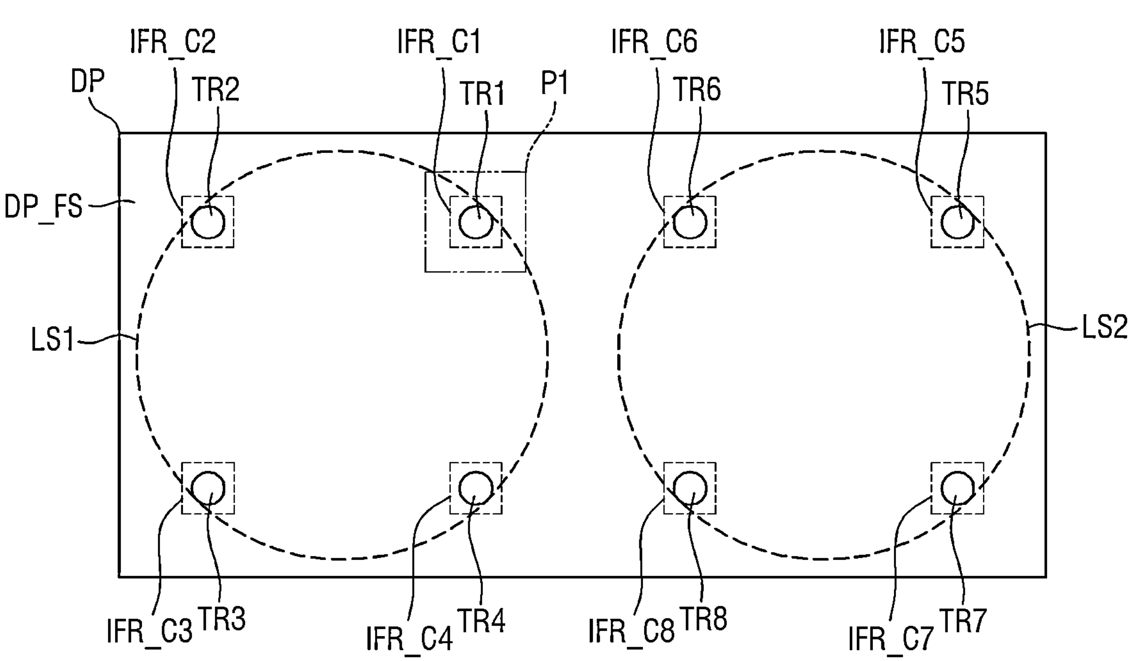
FIG. 4 is a cross-sectional view taken along line A-A' in FIG. 2.
Figure 5:
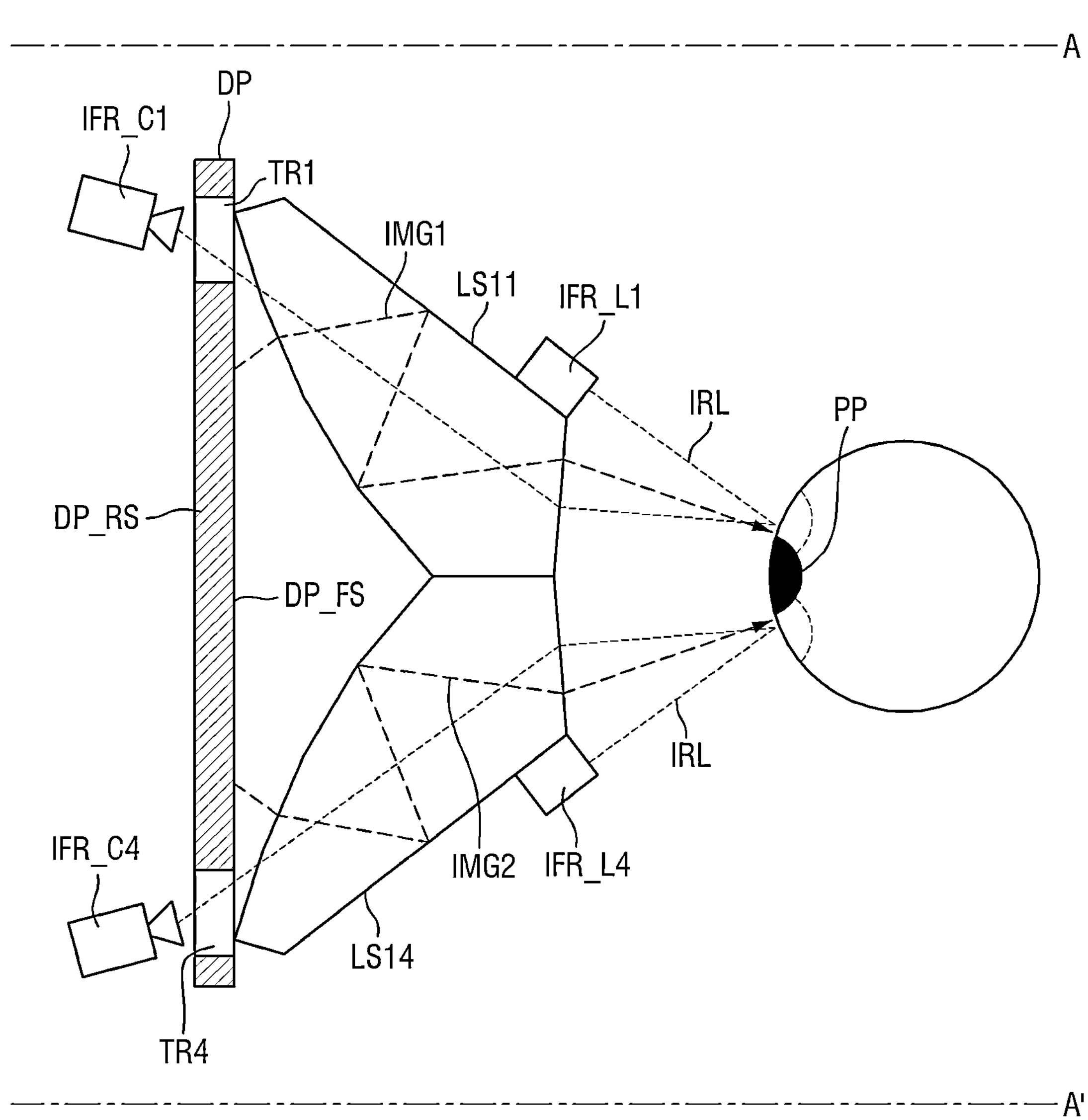
FIG. 5 is a plan view of the display unit.

The control unit may control an operation of at least one selected from the display unit DP, the plurality of infrared light sources (see "IFR_L1, IFR_L2, IFR_L3, IFR_L4, IFR_L5, IFR_L6, IFR_L7, IFR_L8" in FIG. 2), and the plurality of infrared cameras (see "IFR_C1, IFR_C2, IFR_C3, IFR_C4, IFR_C5, IFR_C6, IFR_C7, IFR_C8" in FIGS. 4 and 5). The control unit may analyze images acquired by the infrared cameras (see "IFR_C1, IFR_C2, IFR_C3, IFR_C4, IFR_C5, IFR_C6, IFR_C7, IFR_C8" in FIGS. 4 and 5), calculate a position of user's pupil (PP in FIG. 5), image processing (image mapping) based on the images, and perform an operation for displaying an image processed on the display unit DP. The control unit may be implemented with a dedicated processor including an embedded processor and/or a general-purpose processor including a central processing unit or an application processor, but the disclosure is not limited thereto.

Figure 3A:
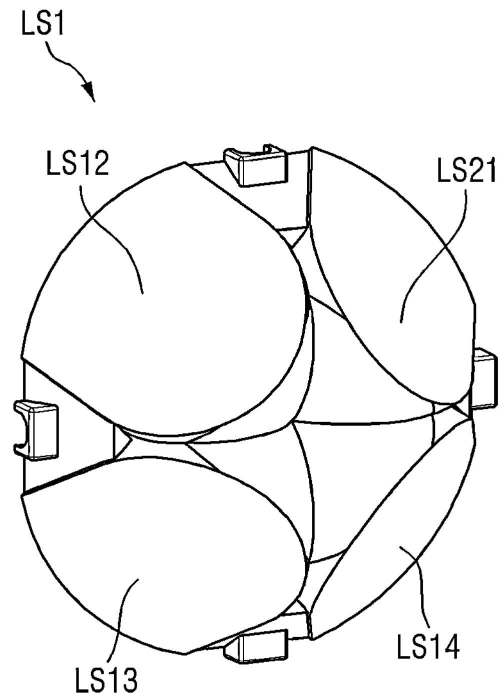
FIGS. 3A and 3B are perspective views of a first lens according to an embodiment.
Figure 3B:
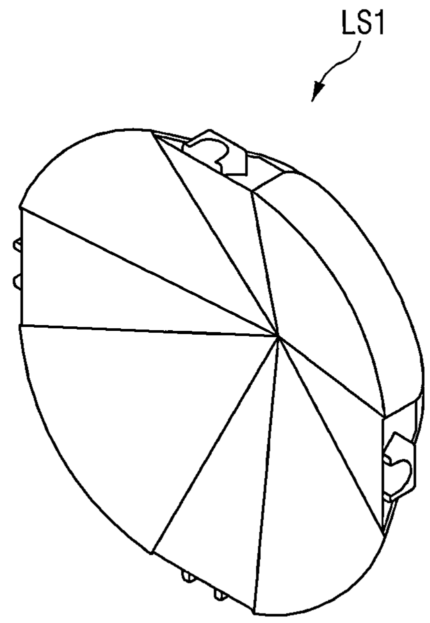
Figure 6:
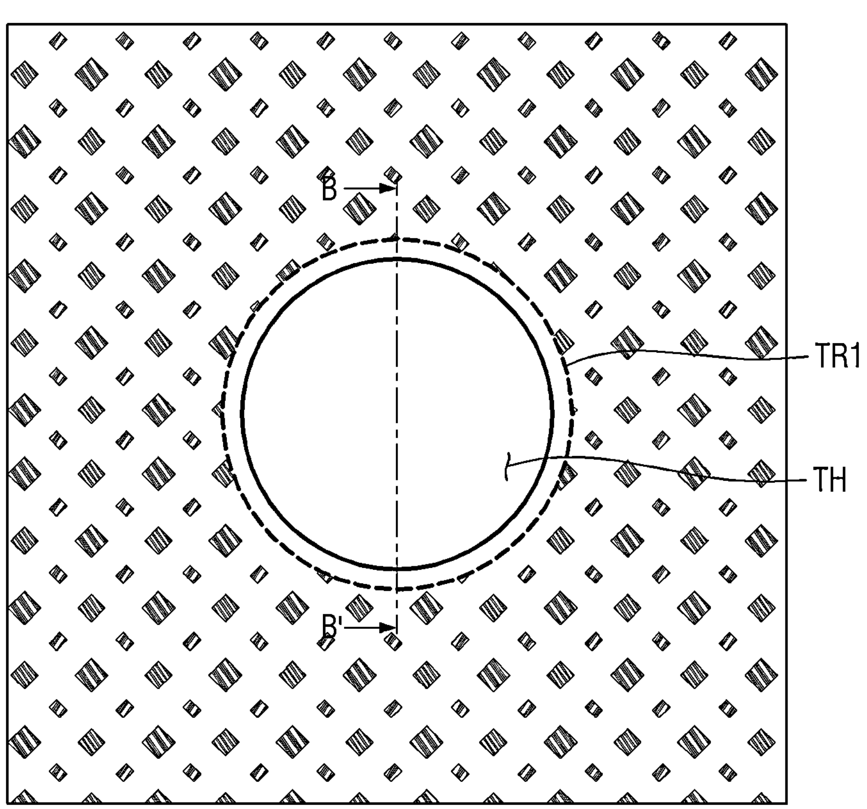
FIG. 6 is a plan view of a transmissive region according to an embodiment.
Figure 7:
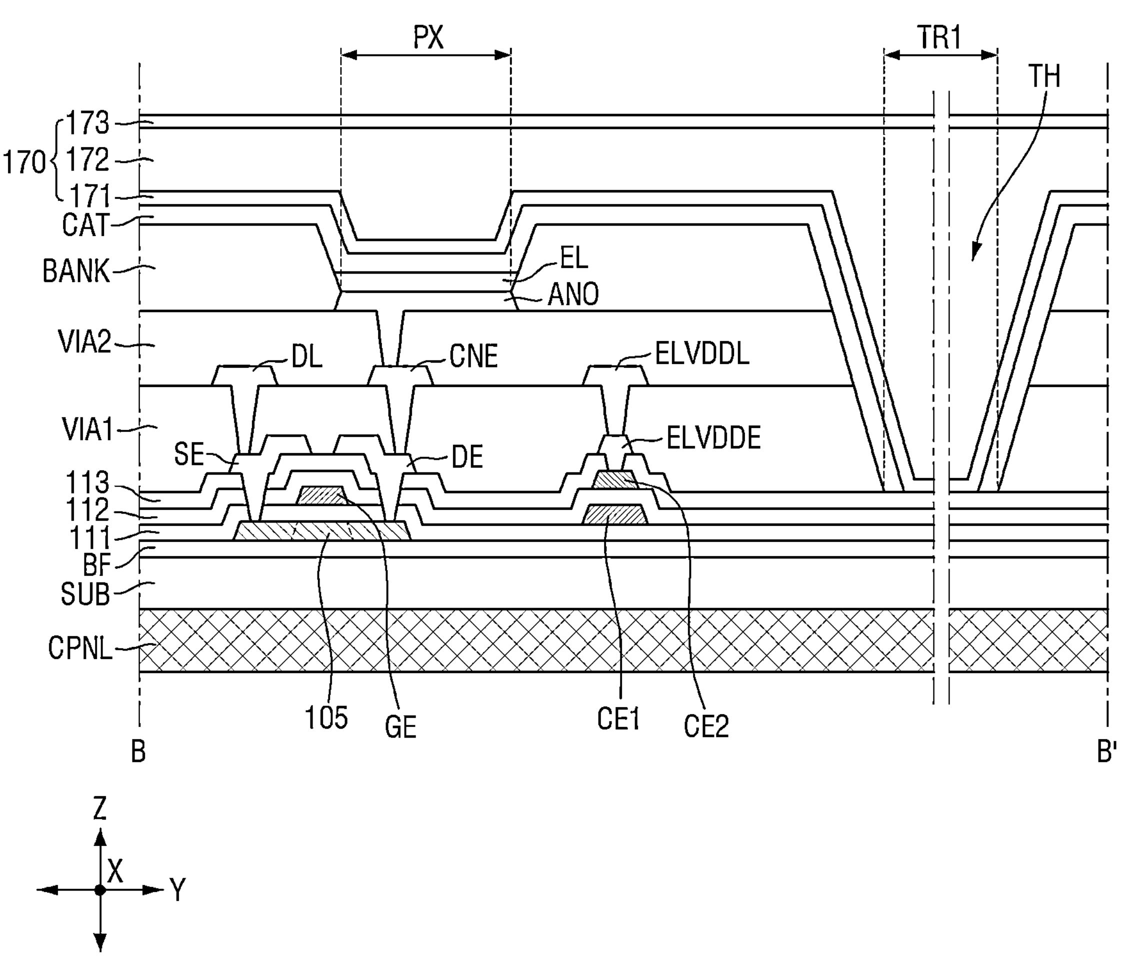
FIG. 7 is a cross-sectional view taken along line B-B' in FIG. 6.

FIG. 2 is a plan view of a plurality of lenses and a display unit according to an embodiment. FIGS. 3A and 3B are perspective views of a first lens according to an embodiment. FIG. 4 is a cross-sectional view taken along line A-A' in FIG. 2. FIG. 5 is a plan view of a display unit. FIG. 6 is a plan view of a transmissive region according to an embodiment. FIG. 7 is a cross-sectional view taken along line B-B' in FIG. 6.

Referring to FIGS. 1 and 2, as shown in FIG. 2, the first lens LS1 and the second lens LS2 may be disposed on the front surface DP_FS of the display unit DP, and may be disposed in positions corresponding to the user's eyes. In one embodiment, for example, the display unit DP may have an approximately rectangular shape that is long in a lateral direction (a horizontal direction in FIG. 2) on a plane, and the first lens LS1 may be positioned on one side (a firsts side or a left side in FIG. 2) on the front surface DP_FS of the display unit DP, and the second lens LS2 may be positioned on another side (a second side or a right side of FIG. 2) on the front surface DP_FS of the display unit DP. Herein, the phrase "on a plane" may mean "when viewed on a plane or in a plan view in a thickness direction of a display unit DP or the first or second lens LS1 or LS2. In an embodiment, the first lens LS1 and the second lens LS2 may be disposed symmetrically based on a center line of the display unit DP, and the first lens LS1 and the second lens LS2 may have substantially a same or similar structure as each other, but the disclosure is not limited thereto.

The first lens LS1 and the second lens LS2 may include a plurality of sub-lenses LS11, LS12, LS13, and LS14 and a plurality of sub-lenses LS21, LS22, LS23, and LS24, respectively.

In an embodiment, the first lens LS1 may include a first sub-lens LS11, a second sub-lens LS12, a third sub-lens LS13, and a fourth sub-lens LS14. The second lens LS2 may include a fifth sub-lens LS21, a sixth sub-lens LS22, a seventh sub-lens LS23, and an eighth sub-lens LS24. However, in embodiments of the invention, the number of the plurality of sub-lenses LS11, LS12, LS13, LS14, LS21, LS22, LS23, and LS24 is not limited thereto.

In such an embodiment, the second lens LS2 is substantially the same as or similar to the first lens LS1. Accordingly, the first lens LS1 will hereinafter be mainly described.

Referring to FIG. 2, the first lens LS1 may have an approximately circular shape on a plane. The first sub-lens LS11, the second sub-lens LS12, the third sub-lens LS13, and the fourth sub-lens LS14 may be disposed to surround a center of the circle on a plane, for example, in a clover shape. In one embodiment, for example, as shown in FIG. 2, the first sub-lens LS11, the second sub-lens LS12, the third sub-lens LS13, and the fourth sub-lens LS14 may be disposed at an upper right portion, an upper left portion, a lower left portion, and a lower right portion based on a center of the first lens LS1, respectively. The first sub-lens LS11, the second sub-lens LS12, the third sub-lens LS13, and the fourth sub-lens LS14 may be integrally connected with each other (e.g., integrally formed as a single unitary unit) or separated from each other.

FIG. 3A is a perspective view illustrating one side (or a first side) of the first lens LS1 facing the user's eye. FIG. 3B is a perspective view illustrating another side (or a second side opposite to the first side) of the first lens LS1 facing the display unit DP.

Referring further to FIGS. 3A and 3B, in an embodiment, the first lens LS1 may have an approximately hemispherical shape. One side of the first lens LS1 facing the main frame MF (or the user's eye) may have a convex shape, and the other side of the first lens LS1 facing the display unit DP may have a concave shape.

In such an embodiment, the second lens LS2 may have an approximately hemispherical shape, but the fifth sub-lens LS21, the sixth sub-lens LS22, the seventh sub-lens LS23, and the eighth sub-lens LS24 may be disposed in a shape surrounding a center of the second lens LS2 on a plane, for example, in a clover shape.

Referring to FIG. 5, the plurality of sub-lenses LS11, LS12, LS13, LS14, LS21, LS22, LS23, and LS24 may each provide a plurality of channels through which light emitted from the front surface DP_FS of the display unit DP passes. Light emitted from different regions of the front surface DP_FS of the display unit DP may pass through each channel in different paths. The light may each include a partial video and/or a partial image for constituting one complete virtual reality ("VR") image (see "IMG_V" in FIGS. 12 and 16).

In one embodiment, for example, as shown in FIG. 5, the first sub-lens LS11 may provide a channel trough which light IMG1 emitted from one region of the display unit DP (for example, an upper end portion of the display unit DP of FIG. 4) passes, and the fourth sub-lens LS14 may provide a channel through which light IMG2 emitted from another region of the display unit DP (for example, a lower end portion of the display unit DP of FIG. 4) passes. The one region and the other region of the display unit DP may include a region overlapping the first sub-lens LS11 and a region overlapping the fourth sub-lens LS14, respectively.

In such an embodiment, although not shown in the drawing, the second sub-lens LS12 and the fourth sub-lens LS14 may each provide channels through which light emitted from different regions of the display unit DP passes.

In an embodiment, light passing through each of the sub-lenses LS11, LS12, LS13, LS14, LS21, LS22, LS23, and LS24 may be provided to the user through two refractions and two reflections, but the disclosure is not limited thereto.

Referring again to FIGS. 2 and 4, the display device 1 may further include the plurality of infrared light sources IFR_L1, IFR_L2, IFR_L3, IFR_L4, IFR_L5, IFR_L6, IFR_L7 and IFR_L8.

The plurality of infrared light sources IFR_L1, IFR_L2, IFR_L3, IFR_L4, IFR_L5, IFR_L6, IFR_L7, and IFR_L8 may be disposed on the first lens LS1 and the second lens LS2. The plurality of infrared light sources IFR_L1, IFR_L2, IFR_L3, IFR_L4, IFR_L5, IFR_L6, IFR_L7, and IFR_L8 may be disposed on one convex side of the first lens LS1 and one convex side of the second lens LS2 facing the main frame MF (or the user's eyes).

The plurality of infrared light sources IFR_L1, IFR_L2, IFR_L3, IFR_L4, IFR_L5, IFR_L6, IFR_L7, and IFR_L8 may include a first infrared light source IFR_L1, a second infrared light source IFR_L2, a third infrared light source IFR_L3, a fourth infrared light source IFR_L4, a fifth infrared light source IFR_L5, a sixth infrared light source IFR_L6, a seventh infrared light source IFR_L7, and an eighth infrared light source IFR_L8.

The first infrared light source IFR_L1, the second infrared light source IFR_L2, the third infrared light source IFR_L3, the fourth infrared light source IFR_L4, the fifth infrared light source IFR_L5, the sixth infrared light source IFR_L6, the seventh infrared light source IFR_L7, and the eighth infrared light source IFR_L8 may be disposed on the first sub-lens LS11, the second sub-lens LS12, the third sub-lens LS13, the fourth sub-lens LS14, the fifth sub-lens LS21, the sixth sub-lens LS22, the seventh sub-lens LS23, and the eighth sub-lens LS24, respectively.

In an embodiment, as shown in FIG. 2, the first infrared light source IFR_L1, the second infrared light source IFR_L2, the third infrared light source IFR_L3, and the fourth infrared light source IPFR_L4 may be positioned inside the boundary of the first lens LS1 on a plane, and may be disposed to surround the center of the first lens LS1, and the fifth infrared light source IFR_L5, the sixth infrared light source IFR_L6, the seventh infrared light source IFR_L7, and the eighth infrared light source IFR_L8 may also be positioned inside the boundary of the second lens LS2, and may be disposed to surround the center of the second lens LS2, but the disclosure is not limited thereto.

Referring to FIGS. 2 and 5, the plurality of infrared light sources IFR_L1, IFR_L2, IFR_L3, IFR_L4, IFR_L5, IFR_L6, IFR_L7, and IFR_L8 may be disposed on inclined surfaces of sub-lenses extending from the display unit DP in a direction to the user's eyes, but the disclosure is not limited thereto.

Referring to FIGS. 2, 4, and 5, the display device 1 may further include the plurality of infrared cameras IFR_C1, IFR_C2, IFR_C3, IFR_C4, IFR_C5, IFR_C6, IFR_C7 and IFR_C8.

Herein, a thickness direction may refer to a thickness direction of the display unit DP and/or an optical axis direction of the multi-channel lens LS.

In an embodiment, the infrared cameras IFR_C1, IFR_C2, IFR_C3, IFR_C4, IFR_C5, IFR_C6, IFR_C7, and IFR_C8 may be a means for detecting a position of a user's pupil PP, but the disclosure is not limited thereto. The display device 1 may include various types of sensors capable of detecting the position of the user's pupil PP.

The plurality of infrared cameras IFR_C1, IFR_C2, IFR_C3, IFR_C4, IFR_C5, IFR_C6, IFR_C7, and IFR_C8 may be disposed on the rear surface DP_RS of the display unit DP. In an embodiment, as shown in FIG. 4, the plurality of infrared cameras IFR_C1, IFR_C2, IFR_C3, IFR_C4, IFR_C5, IFR_C6, IFR_C7, and IFR_C8 may be disposed to overlap a plurality of transmissive regions TR1, TR2, TR3, TR4, TR5, TR6, TR7, and TR8 of the display unit DP to be described later, respectively.

The plurality of infrared cameras IFR_C1, IFR_C2, IFR_C3, IFR_C4, IFR_C5, IFR_C6, IFR_C7, and IFR_C8 may sense infrared light IRL emitted from an infrared light source and reflected from the user's pupil PP. An exact position of the user's pupil PP may be calculated by ultraviolet light sensed by the plurality of infrared cameras IFR_C1, IFR_C2, IFR_C3, IFR_C4, IFR_C5, IFR_C6, IFR_C7, and IFR_C8.

The plurality of infrared cameras IFR_C1, IFR_C2, IFR_C3, IFR_C4, IFR_C5, IFR_C6, IFR_C7, and IFR_C8 may include an image sensor capable of sensing infrared light. The plurality of infrared cameras IFR_C1, IFR_C2, IFR_C3, IFR_C4, IFR_C5, IFR_C6, IFR_C7, and IFR_C8 may generate image data based on the received infrared light. The plurality of infrared cameras IFR_C1, IFR_C2, IFR_C3, IFR_C4, IFR_C5, IFR_C6, IFR_C7, and IFR_C8 may capture an image in front of each of the infrared cameras IFR_C1, IFR_C2, IFR_C3, IFR_C4, IFR_C5, IFR_C6, IFR_C7 and IFR_C8, the direction at which the user is looking may be calculated from the captured image based on the position of the user's pupil PP.

The plurality of infrared cameras IFR_C1, IFR_C2, IFR_C3, IFR_C4, IFR_C5, IFR_C6, IFR_C7, and IFR_C8 may include a first infrared camera IFR_C1, a second infrared camera IFR_C2, a third infrared camera IFR_C3, a fourth infrared camera. IFR_C4, a fifth infrared camera IFR_C5, a sixth infrared camera IFR_C6, a seventh infrared camera IFR_C7 and an eighth infrared camera IFR_C8.

The first infrared camera IFR_C1, the second infrared camera IFR_C2, the third infrared camera IFR_C3, the fourth infrared camera IFR_C4, the fifth infrared camera IFR_C5, the sixth infrared camera IFR_C6, the seventh infrared camera IFR_C7 and the eighth infrared camera IFR_C8 may be disposed to overlap the first sub-lens LS11, the second sub-lens LS12, the third sub-lens LS13, the fourth sub-lens LS14, the fifth sub-lens LS21, the sixth sub-lens LS22, the seventh sub-lens LS23, and the eighth sub-lens LS24 in the thickness direction or on a plane, respectively.

Referring to FIGS. 4 and 5, the first infrared camera IFR_C1, the second infrared camera IFR_C2, the third infrared camera IFR_C3, and the fourth infrared camera IFR_C4 may be disposed adjacent to the boundary of the first lens LS1 on a plane.

The first infrared camera IFR_C1, the second infrared camera IFR_C2, the third infrared camera IFR_C3, and the fourth infrared camera IFR_C4 may be disposed to surround the center of the first lens LS1 along the boundary of the first lens LS1 on a plane.

The first infrared camera IFR_C1, the second infrared camera IFR_C2, the third infrared camera IFR_C3, and the fourth infrared camera IFR_C4 may overlap the boundary of the first lens LS1 in the thickness direction or on a plane.

The boundary of the first lens LS1 may refer to an edge of the first lens LS1 adjacent to or in close contact with the front surface DP_FS of the display unit DP and/or an outermost edge of the other side of the first lens LS1 facing the front surface DP_FS of the display unit DP. The boundary of the first lens LS1 may include each edge of the first sub-lens LS11, the second sub-lens LS12, the third sub-lens LS13, and the fourth sub-lens LS14 that are adjacent to or in close contact with the front surface DP_FS of the display unit DP.

However, the disclosure is not limited thereto, and alternatively, the first infrared camera IFR_C1, the second infrared camera IFR_C2, the third infrared camera IFR_C3, and the fourth infrared camera IFR_C4 may be disposed inside the boundary of the first lens LS1 on a plane.

The fifth infrared camera IFR_C5, the sixth infrared camera IFR_C6, the seventh infrared camera IFR_C7, and the eighth infrared camera IFR_C8 may also be disposed in a manner substantially the same as or similar to that of the first infrared camera IFR_C1, the second infrared camera IFR_C2, the third infrared camera IFR_C3, and the fourth infrared camera IFR_C4, respectively, based on the second lens LS2.

Referring to FIG. 4, an infrared camera that receives infrared light reflected from the user's pupil PP may be changed depending on the gaze direction of the user and/or the position of the user's pupil PP.

In one embodiment, for example, when the user gazes in a direction in which the first sub-lens LS11 is positioned, infrared light emitted from the first infrared light source IFR_L1 may be reflected from the user's pupil PP and may be received by the first infrared camera IFR_C1. In such an embodiment, for example, when the user gazes in a direction in which the fourth sub-lens LS14 is positioned, infrared light emitted from the fourth infrared light source IFR_L4 may be reflected from the user's pupil PP and may be received by the fourth infrared camera IFR_C4. In such an embodiment, although not shown in the drawing, when the user gazes in a direction in which the second sub-lens LS12 is positioned or the third sub-lens LS13 is positioned, infrared light reflected from the user's pupil PP may be received by the second infrared camera IFR_C2 or the third infrared camera IFR_C3.

Referring to FIGS. 4 and 5, in an embodiment of the display device 1, the plurality of infrared light sources IFR_L1, IFR_L2, IFR_L3, IFR_L4, IFR_L5, IFR_L6, IFR_L7, and IFR_L8 and the plurality of infrared cameras IFR_C1, IFR_C2, IFR_C3, IFR_C4, IFR_C5, IFR_C6, IFR_C7, and IFR_C8 are not disposed between the first lens LS1 and the user's eyes, but are disposed on the first lens LS1 or on the rear surface DP_RS of the display unit DP, thereby implementing a slim thickness.

Referring to FIGS. 4 and 5, an embodiment of the display unit DP may include the plurality of transmissive regions TR1, TR2, TR3, TR4, TR5, TR6, TR7, and TR8.

The plurality of transmissive regions TR1, TR2, TR3, TR4, TR5, TR6, TR7, and TR8 may be disposed to overlap the first lens LS1 or the second lens LS2 in a thickness direction or on a plane. As shown in FIG. 5, the plurality of transmissive regions TR1, TR2, TR3, TR4, TR5, TR6, TR7, and TR8 may be disposed adjacent to the boundary of the first lens LS1 or the boundary of the second lens LS2 on a plane. The plurality of transmissive regions TR1, TR2, TR3, TR4, TR5, TR6, TR7, and TR8 may be disposed to overlap the plurality of infrared cameras IFR_C1, IFR_C2, IFR_C3, IFR_C4, IFR_C5, IFR_C6, IFR_C7, and IFR_C8 in the thickness direction or on a plane, respectively.

Each of the plurality of transmissive regions TR1, TR2, TR3, TR4, TR5, TR6, TR7, and TR8 may transmit most of light incident on the front surface DP_FS of the display unit DP. Each of the plurality of transmissive regions TR1, TR2, TR3, TR4, TR5, TR6, TR7, and TR8 may also transmit light in a specific wavelength band, for example, only infrared light among the light incident on the front surface DP_FS of the display unit DP. The light transmitted through the plurality of transmissive regions TR1, TR2, TR3, TR4, TR5, TR6, TR7, and TR8 may be transferred to an infrared camera disposed on the rear surface DP_RS of the display unit DP.

In an embodiment, the plurality of transmissive regions TR1, TR2, TR3, TR4, TR5, TR6, TR7, and TR8 may each be approximately circular on a plane, but the disclosure is not limited thereto. Alternatively, the plurality of transmissive regions TR1, TR2, TR3, TR4, TR5, TR6, TR7, TR8 may be in one of other various shapes such as a square, a triangle, a polygon, or an ellipse.

The plurality of transmissive regions TR1, TR2, TR3, TR4, TR5, TR6, TR7, and TR8 may include a first transmissive region TR1, a second transmissive region TR2, a third transmissive region TR3, a fourth transmissive region TR4, a fifth transmissive region TR5, a sixth transmissive region TR6, a seventh transmissive region TR7, and an eighth transmissive region TR8.

The first transmissive region TR1, the second transmissive region TR2, the third transmissive region TR3, and the fourth transmissive region TR4 may be disposed inside the boundary of the first lens LS1 on a plane. The first transmissive region TR1, the second transmissive region TR2, the third transmissive region TR3, and the fourth transmissive region TR4 may be disposed to overlap the first sub-lens LS11, the second sub-lens LS12, the third sub-lens LS13, and the fourth sub-lens LS14 in the thickness direction or on a plane, respectively.

However, the disclosure is not limited thereto, and the first transmissive region TR1, the second transmissive region TR2, the third transmissive region TR3, and the fourth transmissive region TR4 may be disposed to overlap the boundary of the first lens LS1 in the thickness direction or on a plane.

The fifth transmissive region TR5, the sixth transmissive region TR6, the seventh transmissive region TR7, and the eighth transmissive region TR8 may also be disposed in a manner substantially the same as or similar to the first transmissive region TR1, the second transmissive region TR2, the third transmissive region TR3, and the fourth transmissive region TR4, respectively, based on the second lens LS2.

Since the plurality of transmissive regions TR1, TR2, TR3, TR4, TR5, TR6, TR7, and TR8 have substantially the same or similar structure as each other except for a position at which each transmissive region is disposed, the first transmissive region TR1 will hereinafter be mainly described for convenience of description.

Referring further to FIG. 6, the display unit DP may include a plurality of pixels PX, but at least a part of the plurality of pixels PX may not be disposed in the first transmissive region TR1. That is, at least a part of the plurality of pixels PX may be removed in the first transmissive region TR1.

In an embodiment, the pixel PX may not be disposed in the first transmissive region TR1, and a transmissive hole TH may be defined through at least a part of a plurality of layers constituting the display unit DP. The transmissive hole TH may refer to a window through which light in a specific wavelength band, for example, infrared light passes. In an embodiment, as shown in FIG. 6, the transmissive hole TH may have a circular shape on a plane, but the disclosure is not limited thereto.

Referring further to FIG. 7, as described above, the display unit DP may include a display panel.

The display panel may include a substrate SUB, a plurality of conductive layers disposed on the substrate SUB, a plurality of insulating layers 111, 112, 113, VIA1, and VIA2 that insulate the conductive layers from each other, and an emission layer EL.

The substrate SUB may be disposed over a display region DA and a non-display region NDA. The substrate SUB may be a flexible substrate SUB containing a flexible material such as flexible glass or polyimide.

A buffer layer BF may be disposed on the substrate SUB. The buffer layer BF may prevent penetration of moisture and oxygen from the outside through the substrate SUB. The buffer layer BF may include at least one selected from a silicon nitride ($SiN_x$) film, a silicon oxide ($SiO_2$) film, and a silicon oxynitride ($SiO_xN_y$) film.

A semiconductor layer 105 may be disposed on the buffer layer BF. The semiconductor layer 105 may form a channel of a thin film transistor. The semiconductor layer 105 may be disposed in each pixel PX of the display region DA, and/or may be disposed in the non-display region NDA. The semiconductor layer 105 may include polycrystalline silicon.

A first insulating layer 111 may be disposed on the semiconductor layer 105. The first insulating layer 111 may be disposed over an entire surface of the substrate SUB. The first insulating layer 111 may be a gate insulating film having a gate insulating function.

The first insulating layer 111 may include a silicon compound, a metal oxide, or the like. In one embodiment, for example, the first insulating layer 111 may include silicon oxide, silicon nitride, silicon oxynitride, aluminum oxide, tantalum oxide, hafnium oxide, zirconium oxide, titanium oxide, or the like. The above-listed materials may be used alone or in combination with each other.

A first conductive layer may be disposed on the first insulating layer 111. The first conductive layer may include a gate electrode GE of a thin film transistor and a first electrode CE1 of a storage capacitor.

The first conductive layer may include at least one selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The first conductive layer may be a single film or a stacked film including or made of at least one selected from the above-listed material.

A second insulating layer 112 may be disposed on the first conductive layer. The second insulating layer 112 may insulate the first conductive layer and a second conductive layer from each other. The second insulating layer 112 may be selected from the above-listed materials with respect to the first insulating layer 111.

The second conductive layer may be disposed on the second insulating layer 112. The second conductive layer may include a second electrode CE2 of the storage capacitor. A material of the second conductive layer may be selected from the above-listed materials with respect to the first conductive layer. The first electrode CE1 of the storage capacitor and the second electrode CE2 of the storage capacitor may form a capacitor together with the second insulating layer 112.

A third insulating layer 113 may be disposed on the second conductive layer. The third insulating layer 113 may contain at least one selected from the above-listed materials with respect to the first insulating layer 111. In an embodiment, the third insulating layer 113 may include an organic insulating material. The organic insulating material may be selected from materials to be described later with respect to a first via layer VIA1.

A third conductive layer may be disposed on the third insulating layer 113. The third conductive layer may include a source electrode SE, a drain electrode DE, a high potential voltage electrode ELVDDE, and a signal line.

The third conductive layer may include at least one selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The third conductive layer may be a single film include or made of at least one selected from the above-listed materials. The third conductive layer is not limited thereto, and may be a stacked film. In one embodiment, for example, the third conductive layer may be formed in a stacked structure of Ti/Al/Ti, Mo/Al/Mo, Mo/AlGe/Mo, Ti/Cu, or the like. In an embodiment, the third conductive layer may include Ti/Al/Ti.

The first via layer VIA1 may be disposed on the third conductive layer. The first via layer VIA1 may contain an organic insulating material. The organic insulating material may include at least one selected from an acrylic resin (polyacrylic resin), an epoxy resin, a phenolic resin, a polyamide resin, a polyimide resin, an unsaturated polyester resin, a polyphenylene ether resin, a polyphenylene sulfide resin, and benzocyclobutene ("BCB").

A fourth conductive layer may be disposed on the first via layer VIA1. The fourth conductive layer may include a data line DL, a connection electrode CNE, and a high potential voltage line ELVDDL. The data line DL may be electrically connected to the source electrode SE of the thin film transistor through a contact hole passing through the first via layer VIA1. The connection electrode CNE may be electrically connected to the drain electrode DE of the thin film transistor through a contact hole passing through the first via layer VIA1. The high potential voltage line ELVDDL may be electrically connected to the high potential voltage electrode ELVDDE through a contact hole passing through the first via layer VIA1. The fourth conductive layer may include at least one material selected from the above-listed materials with respect to the third conductive layer.

A second via layer VIA2 may be disposed on the fourth conductive layer 150. The second via layer VIA2 may include at least one selected from the above-listed materials with respect to the first via layer VIA1.

An anode ANO may be disposed on the second via layer VIA2. The anode ANO may be electrically connected to the connection electrode CNE through a contact hole defined through the second via layer VIA2.

A bank layer BANK may be disposed on the anode ANO. A contact hole may be defined through the bank layer BANK to expose the anode ANO. The bank layer BANK may include or be made of an organic insulating material or an inorganic insulating material. In one embodiment, for example, the bank layer BANK may include at least one selected from a photoresist, a polyimide resin, an acrylic resin, a silicone compound, a polyacrylic resin, and the like. In an embodiment, as shown in FIG. 7, the pixel PX may be defined by an opening of the bank layer exposing the emission layer EL.

The emission layer EL may be disposed on an upper surface of the anode ANO and in the opening of the bank layer BANK. A cathode CAT is disposed on the emission layer EL and the bank layer BANK. The cathode CAT may be a common electrode disposed over the plurality of pixels PX.

A thin film encapsulation layer 170 may be disposed on the cathode CAT. The thin film encapsulation layer 170 may cover the emission layer EL or the cathode CAT. The thin film encapsulation layer 170 may be a stacked film in which inorganic films and organic films are alternately stacked with each other. In one embodiment, for example, the thin film encapsulation layer 170 may include a first encapsulation inorganic layer 171, an encapsulation organic layer 172, and a second encapsulation inorganic layer 173 that are sequentially stacked one on another.

The display panel may include a panel lower sheet CPNL disposed on a lower surface of the substrate. In one embodiment, for example, the panel lower sheet CPNL may include at least one functional layer such as, for example, a digitizer, a heat dissipation member, a shield member, and a buffer member.

In an embodiment, as described above, the first transmissive region TR1 may include the transmissive hole TH. In an embodiment, the transmissive hole TH passes through the first via layer VIA1, the second via layer VIA2, and the bank layer BNK, and the third insulating layer 113 may be exposed through the transmissive hole TH. In such an embodiment, the first encapsulation inorganic layer 171 and the third insulating layer 113 may be in direct contact with each other, and the inside of the transmissive hole TH may be filled by the encapsulation organic layer 172.

However, the disclosure is not limited thereto, and alternatively, the transmissive hole TH may be defined or formed further through at least one layer disposed under the first via layer VIA1, for example, the third insulating layer 113, or may be defined or formed through only the bank layer BNK and/or the first via layer VIA1. In another alternative embodiment, the transmissive hole TH may be defined or formed completely through the display panel.

The second transmissive region TR2, the third transmissive region TR3, the fourth transmissive region TR4, the fifth transmissive region TR5, the sixth transmissive region TR6, the seventh transmissive region TR7, and the eighth the transmissive region TR8 have a structure substantially the same as or similar to that of the first transmissive region TR1, and thus any repetitive detailed descriptions thereof will be omitted.

Figure 8:
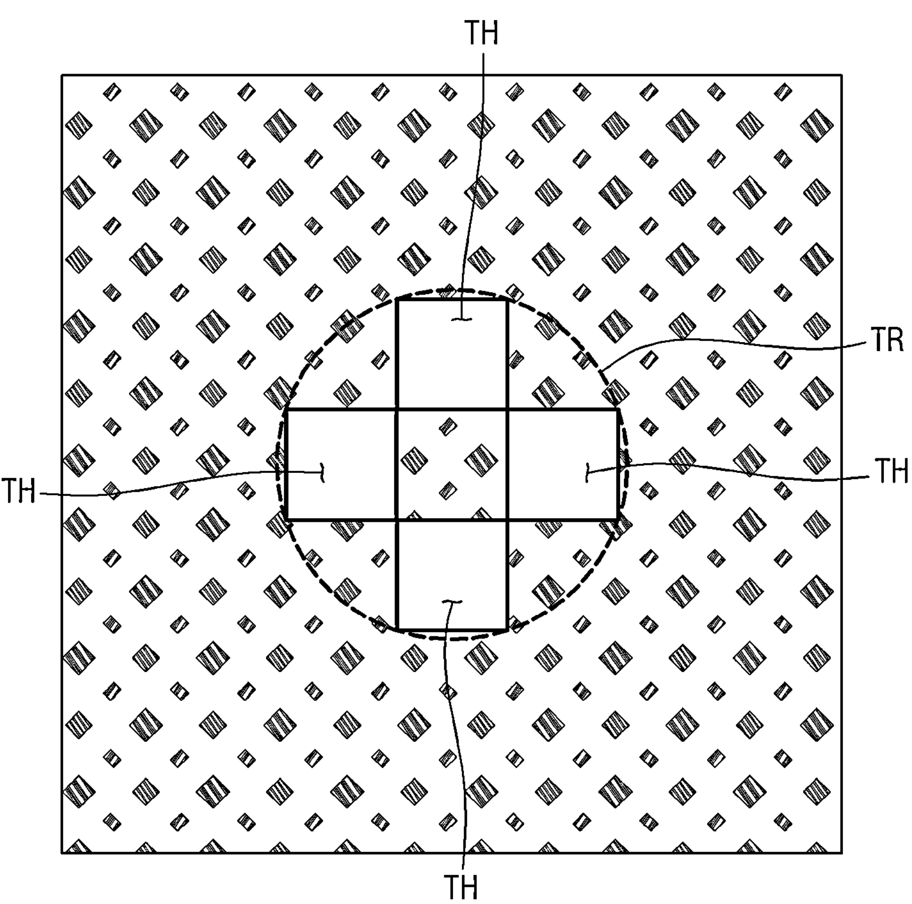
FIG. 8 is a plan view of a transmissive region according to an alternative embodiment.

FIG. 8 is a plan view of a transmissive region according to an alternative embodiment.

Referring to FIG. 8, unlike the embodiment of FIG. 7, at least one pixel PX may be disposed in the first transmissive region TR1. In such an embodiment, a plurality of transmissive holes TH may be defined in the first transmissive region TR1, and a plurality of pixels PX may be disposed between the plurality of transmissive holes TH.

The plurality transmissive hole TH may have a structure substantially the same as or similar to that of the transmissive hole TH of FIG. 7. In an embodiment, each of the plurality transmissive hole TH may have a rectangular shape on a plane, but the disclosure is not limited thereto. Alternatively, the plurality transmissive hole TH may be in one of other various shapes such as a triangle, a polygon, a circle, or an ellipse.

In such an embodiment, although not shown in the drawing, the plurality of pixels PX and the plurality of transmissive holes TH disposed therebetween may also be disposed in the second transmissive region TR2, the third transmissive region TR3, the fourth transmissive region TR4, the fifth transmissive region TR5, the sixth transmissive region TR6, the seventh transmissive region TR7, and the eighth transmissive region TR8.

The embodiment of FIG. 8 is substantially the same as or similar to the embodiment of FIGS. 1 to 7 except that the pixel PX is disposed in the first transmissive region TR1, and thus any repetitive detailed descriptions of the same or like elements will be omitted.

Figure 10:
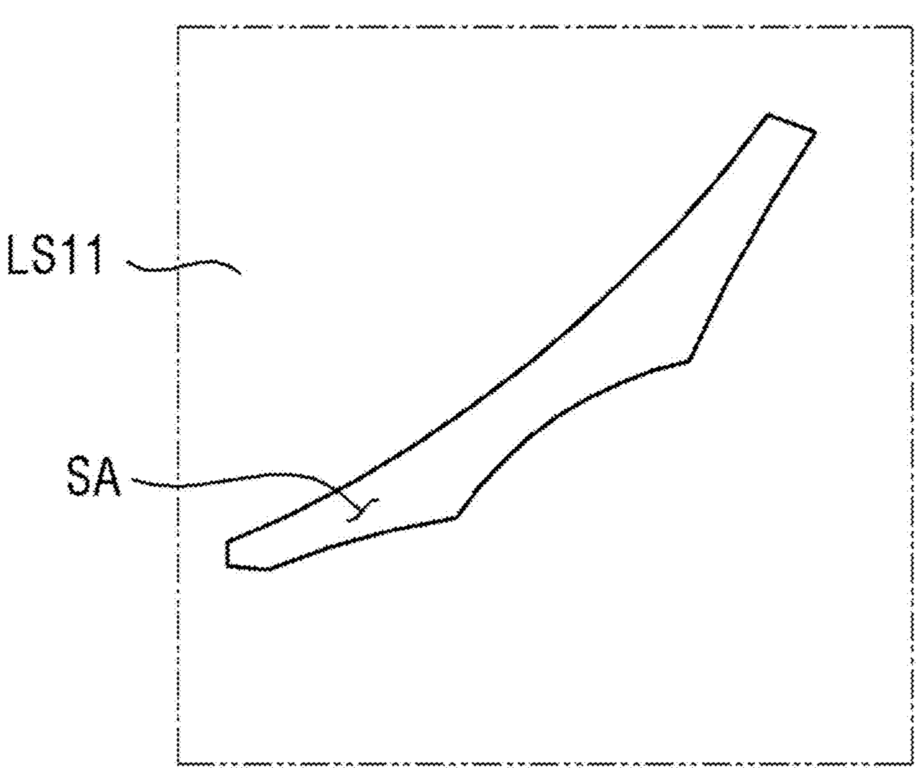
FIG. 10 is a view illustrating a screen photographed by an infrared camera when the user's pupil is positioned at the origin.
Figure 11:
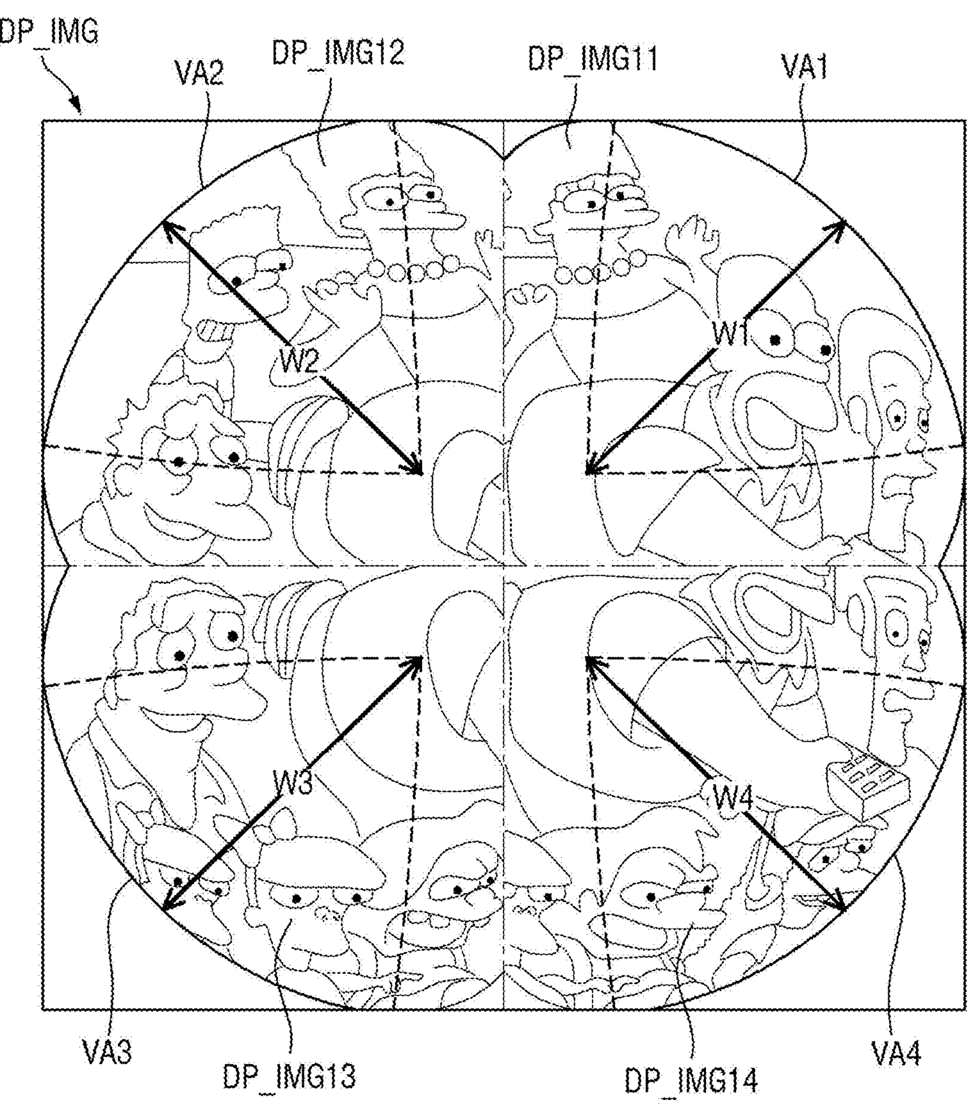
FIG. 11 is a view illustrating a display image displayed by a display unit when the user's pupil is positioned at the origin.
Figure 12:
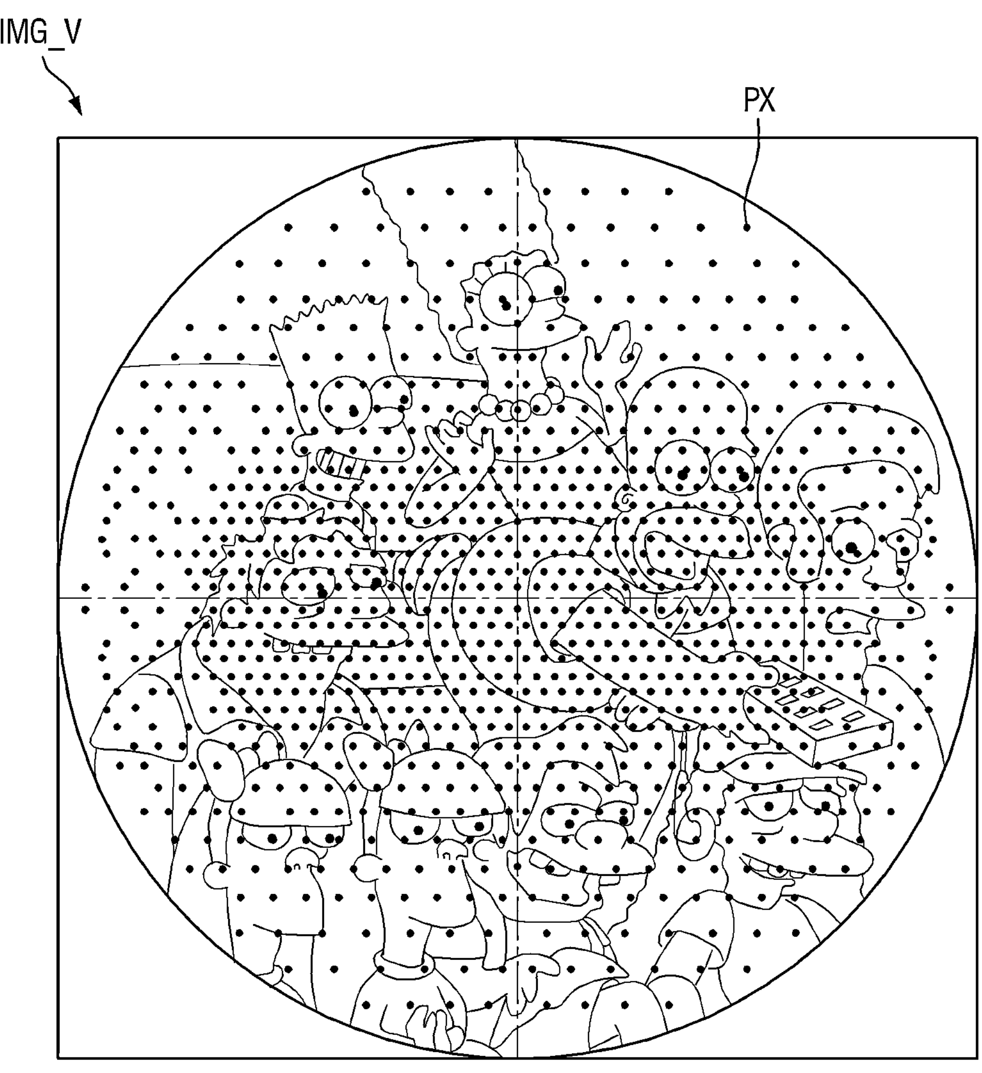
FIG. 12 is a view illustrating a virtual reality ("VR") image recognized by the user when the user's pupil is positioned at the origin.

FIG. 9 is a view illustrating a case in which a user's pupil is positioned at an origin. FIG. 10 is a view illustrating a screen photographed by an infrared camera when the user's pupil is positioned at the origin. FIG. 11 is a view illustrating a display image displayed by a display unit when the user's pupil is positioned at the origin. FIG. 12 is a view illustrating a VR image recognized by the user when the user's pupil is positioned at the origin.

As described above, in an embodiment of the display device 1, since the configuration and operation corresponding to one eye of the user (e.g., the left eye) are substantially the same as or similar to the configuration and operation corresponding to the other eye of the user (e.g., the right eye), hereinafter, the configuration corresponding to the one eye (the first lens LS1, the first infrared light source IFR_L1, the second infrared light source IFR_L2, the third infrared light source IFR_L3, the fourth infrared light source IFR_L4, the first infrared camera IFR_C1, the second infrared camera IFR_C2, the third infrared camera IFR_C3, the fourth infrared camera IFR_C4, and the like) will be mainly described.

Referring to FIG. 9, as described above, the position of the user's pupil PP may be calculated based on images captured by the plurality of infrared cameras IFR_C1, IFR_C2, IFR_C3, IFR_C4, IFR_C5, IFR_C6, IFR_C7, and IFR_C8. The display device 1 may display a display image DP_IMG on the display unit DP based on the calculated position of the user's pupil PP. The display image DP_IMG may be an image to which a mapping algorithm corresponding to the position of the user's pupil PP is applied by the control unit of the display device 1.

As shown in FIG. 9, in an embodiment, virtual planes P1_1, P1_2, P1_3, and PT_4 for setting coordinates corresponding to the position of the user's pupil PP may be defined. The virtual planes P1_1, P1_2, P1_3, and P1_4 may be disposed parallel to the display unit DP. An origin CC of the virtual planes P1_1, P1_2, P1_3, and PT_4 may overlap the center of the first lens LS1 and/or the display image DP_IMG displayed on the display unit DP in the thickness direction. In one embodiment, for example, the control unit may detect an outline of the user's pupil PP and set a center point of a shape defined by the corresponding outline as the coordinates of the pupil PP.

The virtual planes P1_1, P1_2, P1_3, and PT_4 are defined by a first axis AX1 extending in one direction and a second axis AX2 crossing the first axis AX1, and may include a first quadrant P1_1, a second quadrant P1_2, a third quadrant P1_3, and a fourth quadrant PT_4 arranged in a counterclockwise direction when looking at the display unit DP based on the origin CC.

When the user gazes in a direction in which the first sub-lens LS11 is positioned, the user's pupil PP may be positioned in the first quadrant P1_1. In addition, when the user gazes in a direction in which the second sub-lens LS12 is positioned, the user's pupil PP may be positioned in the second quadrant P1_2, when the user gazes in a direction in which the third sub-lens LS13 is positioned, the user's pupil PP may be positioned in the third quadrant P1_3, and when the user gazes in a direction in which the fourth sub-lens LS14 is positioned, the user's pupil PP may be positioned in the fourth quadrant P1_4.

When the user gazes in the direction in which the first sub-lens LS11 is positioned, when the user gazes in a direction in which the second sub-lens LS12 is positioned, when the user gazes in a direction in which the third sub-lens LS13 is positioned, and when the user gazes in a direction in which the fourth sub-lens LS14 is positioned may refer to when the user gazes at a first divided viewing region VAT, when the user gazes at a second divided viewing region VA2, when the user gazes at a third divided viewing region VA3, and when the user gazes at a fourth divided viewing region VA4 to be described later, respectively.

Referring to FIGS. 9 and 10, when the user's pupil PP is approximately positioned at the origin CC, the user's pupil PP may not be recognized by the first infrared camera IFR_C1, the second infrared camera IFR_C2, the third infrared camera IFR_C3, and the fourth infrared camera IFR_C4.

A case in which the user's pupil PP is approximately positioned at the origin CC may refer to a case in which the user gazes a center of the first lens LS1, the display image DP_IMG, and/or a VR image IMG_V to be described later.

As shown in FIG. 10, when the user's pupil PP is approximately positioned at the origin CC, the user's pupil PP may not be detected in a detection region SA of an image captured by the first infrared camera IFR_C1.

Referring to FIGS. 9 to 11, when the user's pupil PP is not recognized by the first infrared camera IFR_C1, the second infrared camera IFR_C2, the third infrared camera IFR_C3, and the fourth infrared camera IFR_C4, the control unit may determine that the user gazes at the center of the first lens LS1, the display image DP_IMG, and/or the VR image IMG_V to be described later. In this case, the display unit DP may display the display image DP_IMG corresponding to the position of the user's pupil PP (the coordinates of the pupil PP).

Referring to FIG. 11, the display unit DP may display divided display images DP_IMG11, DP_IMG12, DP_IMG13 and DP_IMG14 divided into four as the display image DP_IMG. The display image DP_IMG may include a first divided display image DP_IMG11, a second divided display image DP_IMG12, a third divided display image DP_IMG13, and a fourth divided display image DP_IMG14 that are arranged counterclockwise on a plane when looking at the front surface DP_FS of the display unit DP based on a center of the display image DP_IMG.

When the user's pupil PP is approximately positioned at the origin CC (for example, (0,0)), the first divided display image DP_IMG11, the second divided display image DP_IMG12, the third divided display image DP_IMG13, and the fourth divided display image DP_IMG14 may be displayed to have approximately a same size as each other. The size of each of the divided display images DP_IMG may refer to a width in a radial direction (a diagonal direction) based on the center of the display image DP_IMG. However, the disclosure is not limited thereto, and alternatively, the size may refer to a width in a horizontal direction and/or a width in a vertical direction on a plane.

As shown in FIG. 11, the sizes of the first divided display image DP_IMG11, the second divided display image DP_IMG12, the third divided display image DP_IMG13, and the fourth divided display image DP_IMG14 may be measured based on boundaries between the first divided viewing region VA1, the second divided viewing region VA2, the third divided viewing region VA3, and the fourth divided viewing region VA4 to be described later, but the disclosure is not limited thereto. Alternatively, the sizes of the first divided display image DP_IMG11, the second divided display image DP_IMG12, the third divided display image DP_IMG13, and the fourth divided display image DP_IMG14 may be measured based on an intersection of the boundaries disposed therebetween.

As shown in FIG. 11, a first width W1 of the first divided display image DP_IMG11, a second width W2 of the second divided display image DP_IMG12, a third width W3 of the third divided display image DP_IMG13, and a fourth width W4 of the fourth divided display image DP_IMG14 may be approximately the same as each other. Accordingly, the first divided display image DP_IMG11, the second divided display image DP_IMG12, the third divided display image DP_IMG13, and the fourth divided display image DP_IMG14 may be respectively displayed on the display unit DP at substantially a same magnification as each other.

Referring further to FIG. 12, the display device 1 may output a foveated-rendered VR image IMG_V to the display unit DP based on the position of the user's pupil PP. The VR image IMG_V may refer to an image and/or a video recognized by the user through the multi-channel lens LS. The foveated rendering may refer to an image processing method that minimizes a graphic computational load while implementing a high-definition VR experience with high immersion by displaying only a region in which the user gazes in the maximum image quality and expressing the other regions in low image quality.

Referring to FIGS. 11 and 12, in an embodiment, the VR image IMG_V may be generated by combining parts of a plurality of divided display images DP_IMG11, DP_IMG12, DP_IMG13, and DP_IMG14.

In such an embodiment, the first divided display image DP_IMG11, the second divided display image DP_IMG12, the third divided display image DP_IMG13, and the fourth divided display image DP_IMG14 may include the first divided viewing region VA1, the second divided viewing region VA2, the third divided viewing region VA3, and the fourth divided viewing region VA4, respectively.

The first divided viewing region VA1, the second divided viewing region VA2, the third divided viewing region VA3, and the fourth divided viewing region VA4 may be defined, for example, by optical characteristics of the multi-channel lens LS and the gaze direction of the user. A shape, size and/or magnification of each of the first divided viewing region VA1, the second divided viewing region VA2, the third divided viewing region VA3, and the fourth divided viewing region VA4 may vary depending on the optical characteristics of the multi-channel lens LS and the gaze direction of the user.

When the user's pupil PP is approximately positioned at the origin CC, the display unit DP may display the display image DP_IMG so that a magnification of a central region of the display image DP_IMG is larger than that of a surrounding region of the display image DP_IMG surrounding the central region.

As shown in FIG. 12, when the user's pupil PP is approximately positioned at the origin CC, a central region of the VR image IMG_V may have a relatively higher pixel density than the surrounding region surrounding the central region. In this case, the pixel density may increase gradually from an edge of the VR image IMG_V toward the center of the VR image IMG_V. Accordingly, the central region of the VR image IMG_V may be displayed in a higher quality (or resolution) than the surrounding region.

The central region of the VR image IMG_V may refer to an intersection of boundaries between an image of the first divided viewing region VA1, an image of the second divided viewing region VA2, an image of the third divided viewing region VA3, and an image of the fourth divided viewing region VA4 that are recognized by being combined by the user, and an adjacent region surrounding the intersection, but the disclosure is not limited thereto.

Figure 13:
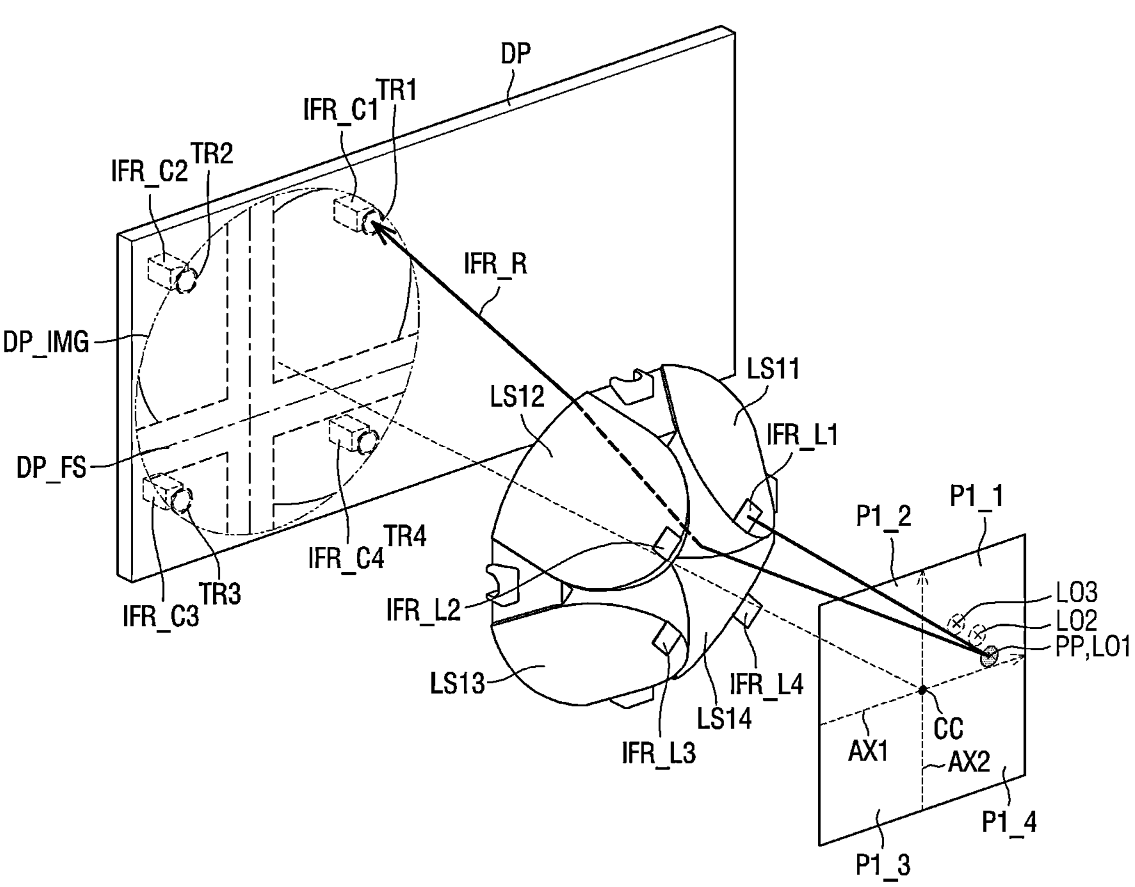
FIG. 13 is a view illustrating a case in which the user's pupil is positioned in a first quadrant.
Figure 14:
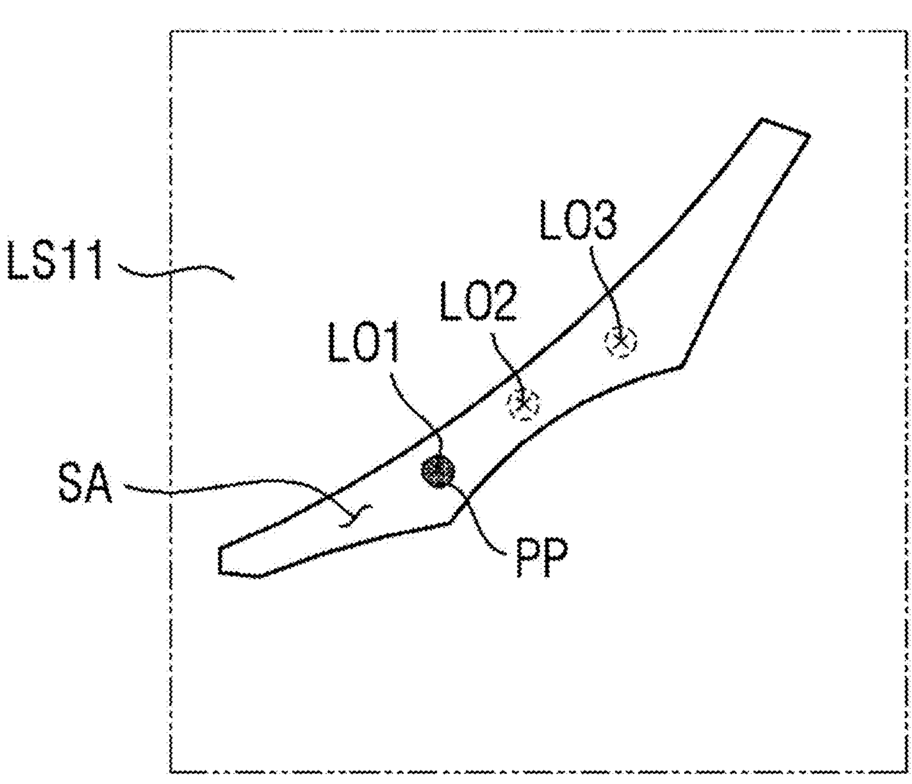
FIG. 14 is a view illustrating a screen photographed by an infrared camera when the user's pupil is positioned in the first quadrant.
Figure 15:
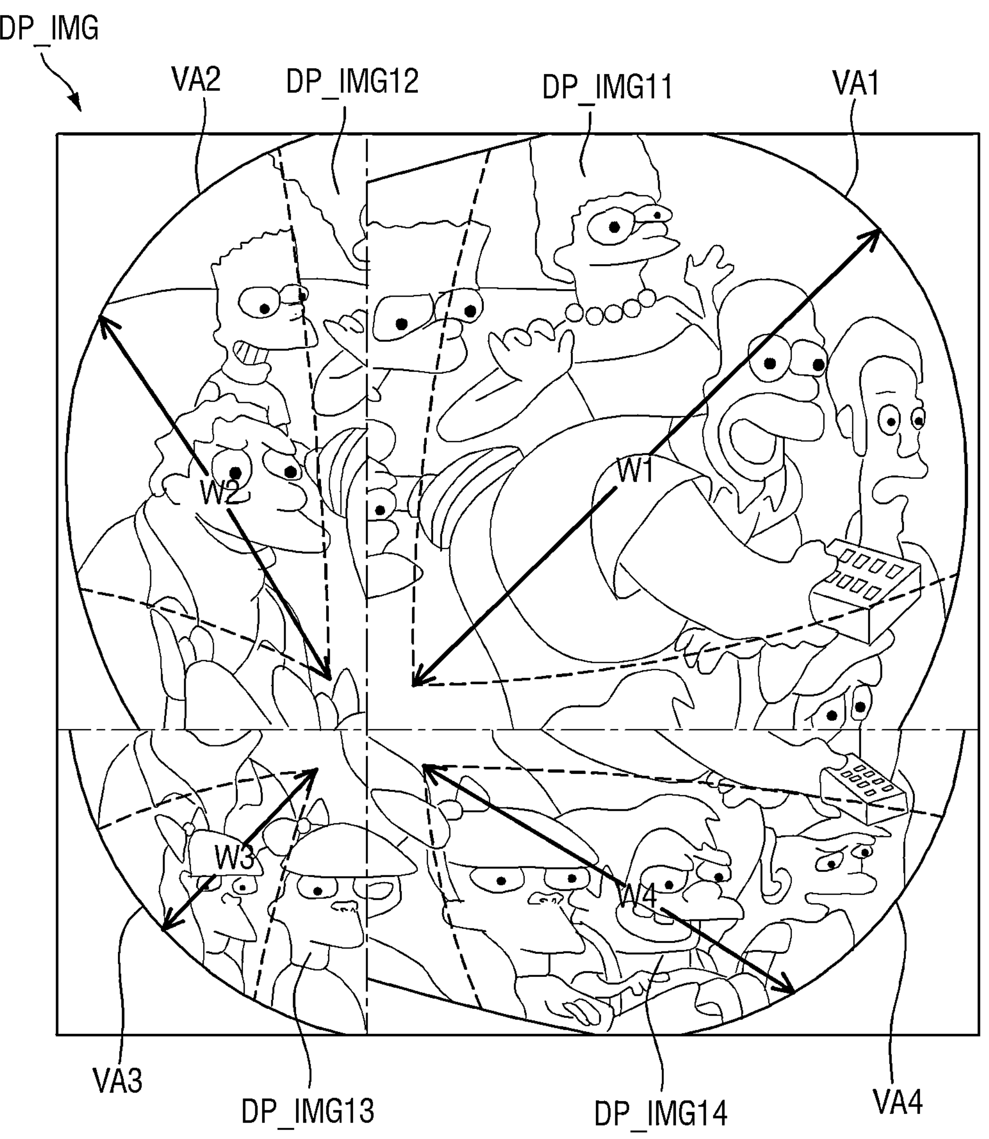
FIG. 15 is a view illustrating a display image displayed by the display unit when the user's pupil is positioned in the first quadrant.
Figure 16:
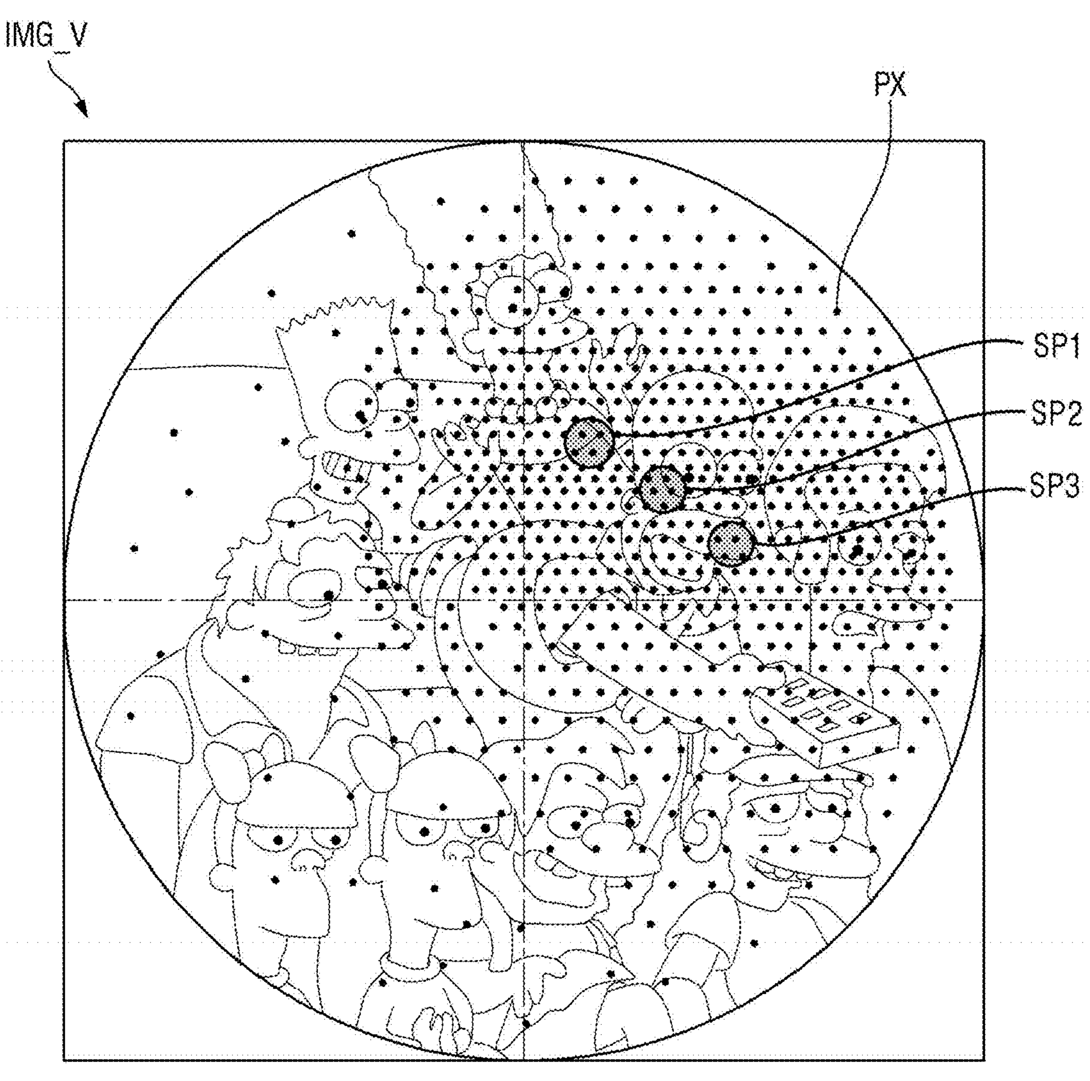
FIG. 16 is a view illustrating a VR image recognized by the user when the user's pupil is positioned in the first quadrant.

FIG. 13 is a view illustrating a case in which the user's pupil is positioned in a first quadrant. FIG. 14 is a view illustrating a screen photographed by an infrared camera when the user's pupil is positioned in the first quadrant. FIG. 15 is a view illustrating a display image displayed by the display unit when the user's pupil is positioned in the first quadrant. FIG. 16 is a view illustrating a VR image recognized by the user when the user's pupil is positioned in the first quadrant.

Referring to FIG. 13, when the user's pupil PP is positioned at a position other than the origin CC, the user's pupil PP may be recognized by at least one among the first infrared camera IFR_C1, the second infrared camera IFR_C2, the third infrared camera IFR_C3, and the fourth infrared camera IFR_C4.

Referring to FIGS. 13 and 14, for example, when the user's pupil PP is positioned in the first quadrant P1_1, infrared light reflected from the user's pupil PP may be received by the first infrared camera IFR_C1. As shown in FIG. 14, the user's pupil PP may be detected in the detection region SA of the image captured by the first infrared camera IFR_C1.

A direction in which the user gazes, specific regions SP1, SP2, and SP3 in which the user gazes in the display images DP_IMG, and/or specific regions SP1, SP2, and SP3 in which the user gazes in the VR images IMG_V may be calculated based on the detected position of the user's pupil PP. In one embodiment, for example, when the user's pupil PP is positioned in a first position LO1, the control unit may determine that the user gazes a first gaze region SP1 of the VR image IMG_V based on a pre-stored lookup table. In such an embodiment, when the user's pupil PP is positioned in a second position LO2 or a third position LO3, the control unit may determine that the user gazes a second gaze region SP2 or a third gaze region SP3 of the VR image IMG_V. The lookup table may be generated through an experiment for deriving a correlation between the position of the user's pupil PP captured by the infrared camera and actual coordinates of the user's pupil PP.

Referring to FIGS. 13 to 15, when the direction in which the user gazes and/or the specific regions SP1, SP2, and SP3 of the VR images IMG_V in which the user gazes are calculated, the display unit DP may display a display image DP_IMG corresponding thereto. As described above, the display image DP_IMG may be an image in which mapping of an image corresponding to the position of the user's pupil PP has been performed.

In one embodiment, for example, when the user's pupil PP is positioned in the first quadrant P1_1, as shown in FIG. 15, the display unit DP may display the display image DP_IMG so that the first divided viewing region VA1 has a size larger than the remaining divided regions VA2, VA3, and VA4. In this case, the size of each of the second divided viewing region VA2 and the fourth divided viewing region VA4 may be smaller than that of the first divided viewing region VA1 but larger than that of the third divided viewing region VA3. The size of each of the divided display images DP_IMG may refer to a width in a radial direction (a diagonal direction) based on the center of the display image DP_IMG. However, the disclosure is not limited thereto, and alternatively, the size may refer to a width in a horizontal direction and/or a width in a vertical direction on a plane.

As shown in FIG. 15, when the user's pupil PP is positioned in the first quadrant P1_1, the first width W1 may be larger than the second width W2, the third width W3, and the fourth width W4. In this case, the fourth width W4 may be smaller than the second width W2 and the third width W3. Accordingly, the first divided display image DP_IMG11 may be displayed on the display unit DP at the largest magnification, and the second divided display image DP_IMG12 and the third divided display image DP_IMG13 may be displayed at a magnification smaller than the first divided display image DP_IMG11, and the fourth divided display image DP_IMG14 may be displayed at the smallest magnification.

Although not shown in the drawing, even when the user's pupil PP is positioned in the second quadrant P1_2, the third quadrant P1_3, or the fourth quadrant P1_4, the display image DP_IMG mapped by a manner substantially the same as or similar to the above may be displayed on the display unit DP.

Referring to FIGS. 13 to 16, when the user's pupil PP is positioned in the first quadrant P1_1, the specific regions SP1, SP2, and SP3 of the VR image IMG_V corresponding to the first quadrant P1_1, for example, an upper right end of FIG. 16 may have a relatively higher pixel density than the surrounding region. In this case, the pixel density may increase gradually from the edge of the VR image IMG_V toward the specific regions SP1, SP2, and SP3 of the VR image IMG_V. Accordingly, the specific regions SP1, SP2, and SP3 of the VR image IMG_V may be displayed in higher quality than the surrounding region, but images in the surrounding region may be displayed in a relatively lower quality than the image of the first divided viewing region VA1. In FIG. 16, three specific regions SP1, SP2, and SP3 are shown, but the number and area of the specific regions SP1, SP2, and SP3 are not limited thereto.

Figure 17:
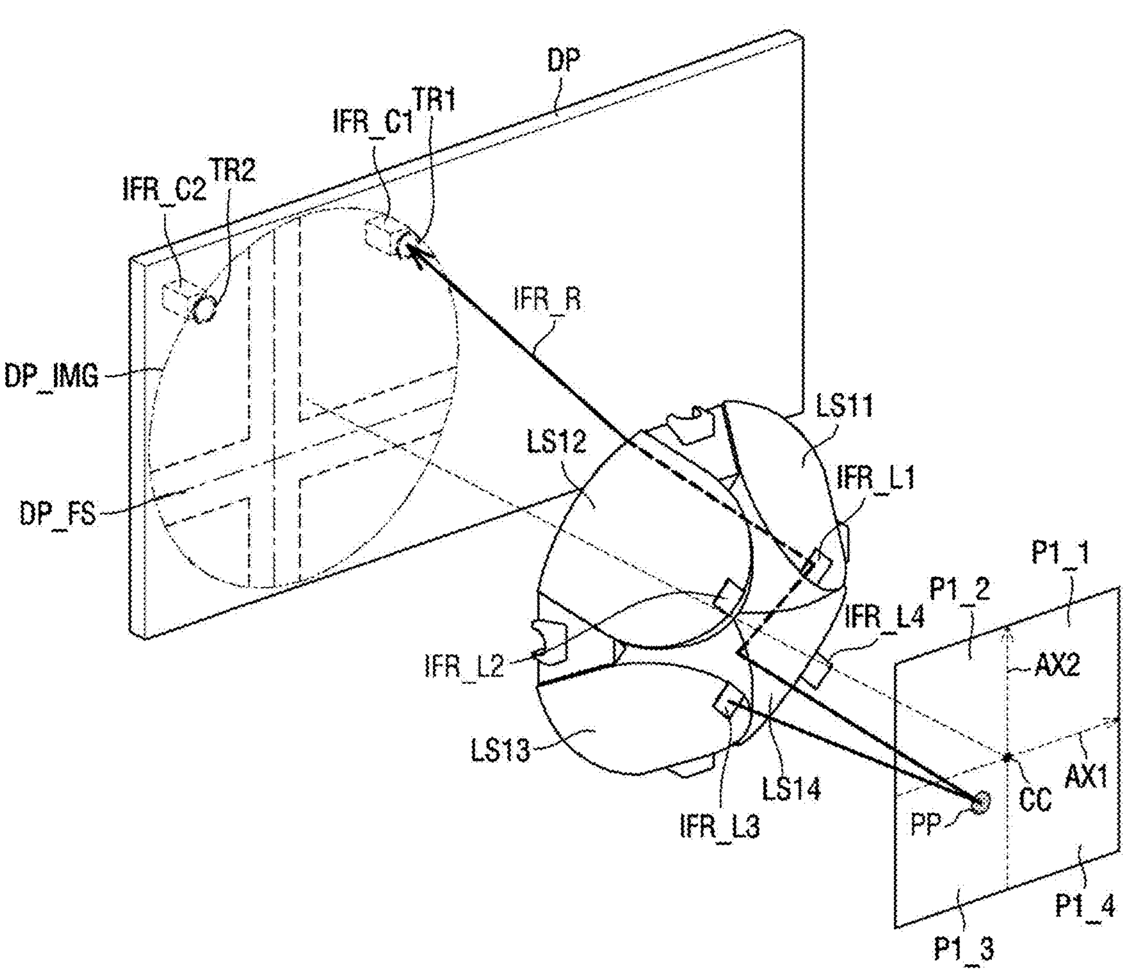
FIG. 17 is a view illustrating the arrangement of a plurality of infrared cameras according to an alternative embodiment.
Figure 18:
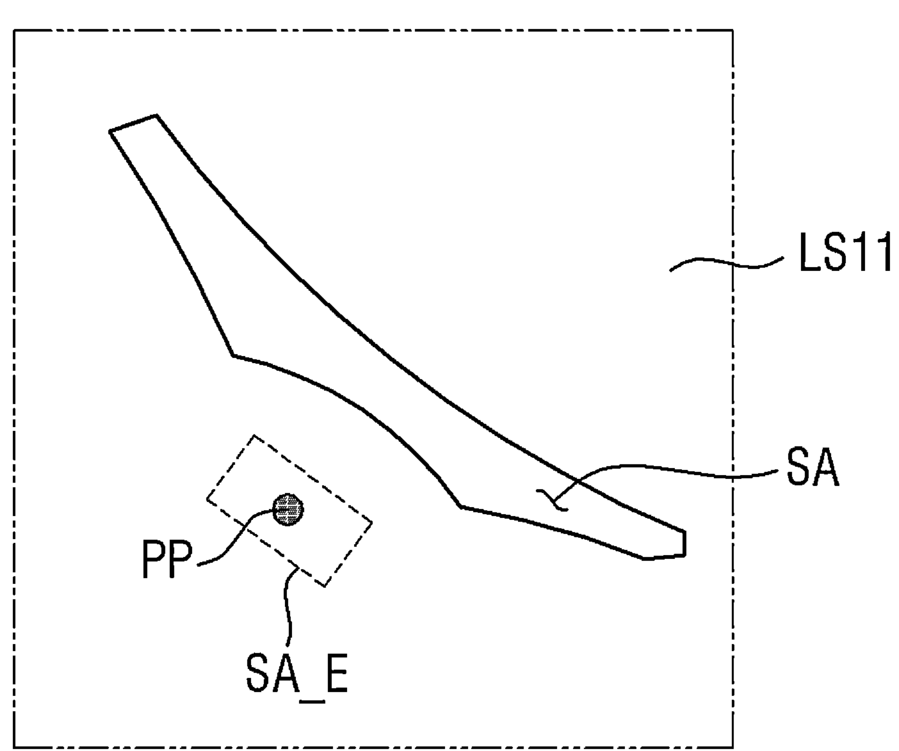
FIG. 18 is a view illustrating a screen photographed by a first infrared camera of FIG. 17.

FIG. 17 is a view illustrating the arrangement of a plurality of infrared cameras according to an alternative embodiment. FIG. 18 is a view illustrating a screen photographed by a first infrared camera of FIG. 17.

Referring to FIG. 17, unlike the embodiment of FIGS. 1 to 16, only two infrared cameras IFR_C1 and IFR_C2 may be disposed corresponding to one eye of a user.

In such an embodiment, as shown in FIG. 17, a first infrared camera IFR_C1 and a second infrared camera IPR_C2 may be disposed to overlap a first transmissive region TR1 and a second transmissive region TR2 on a rear surface DP_RS of a display unit DP, respectively, on a plane.

Each of the first infrared camera IFR_C1 and the second infrared camera IPR_C2 may include a wide-angle lens. Accordingly, the first infrared camera IFR_C1 and the second infrared camera IFR_C2, even when a user's pupil PP is positioned in a third quadrant P1_3 or a fourth quadrant P1_4, the user's pupil PP may be detected. That is, when the wide-angle lens is applied, a position of the user's pupil PP may be accurately detected even with a small number of infrared cameras IFR_C1 and IFR_C2 compared to the embodiment of FIGS. 1 to 16.

Referring to FIGS. 17 and 18, when the user's pupil PP is positioned in the third quadrant P1_3, the user's pupil PP may be detected by the first infrared camera IFR_C1. In one embodiment, for example, as shown in FIG. 17, infrared light reflected from the user's pupil PP may be incident on the third sub-lens LS13 and then reflected and/or refracted to be incident on the first sub-lens LS11, and the infrared light incident on the first sub-lens LS11 may be reflected and/or refracted again to be incident on the first infrared camera IFR_C1, but a path of the infrared light is not limited thereto. Similarly, although not shown in the drawing, when the user's pupil PP is positioned in the fourth quadrant P1_4, the user's pupil PP may be detected by the second infrared camera IFR_C2.

Referring to FIG. 18, when the user's pupil PP is positioned in the third quadrant P1_3, the user's pupil PP may be detected in a second detection region SA_E spaced apart from a first detection region SA among images captured by the first infrared camera IFR_C1. Referring further to FIG. 14, the first detection region SA may be a region in which the user's pupil PP is detected when the user's pupil PP is positioned in the first quadrant P1_1. In FIG. 18, the second detection region SA_E may be positioned at a lower left portion of the first detection region SA, and may be smaller than the first detection region SA, but the position and size of the second detection region SA_E are not limited.

Referring further to FIG. 9, although not shown in the drawing, when only the third infrared camera IFR_C3 and the fourth infrared camera IFR_C4 are used, or even when only the first infrared camera IFR_C1 and the fourth infrared camera IFR_C4 (the second infrared camera IFR_C2 and the third infrared camera IFR_C3) are used, an effect substantially the same as or similar to that of the embodiment of FIG. 17 may be obtained.

FIG. 19 is a flowchart of a control method of a display device according to an embodiment.

Referring to FIG. 19, an embodiment of a control method of a display device 1 may include detecting a position of a user's pupil PP based on infrared light received through a plurality of transmissive regions TR1, TR2, TR3, TR4, TR5, TR6, TR7, and TR8 of a display unit DP, and displaying a display image DP_IMG corresponding to the position of the user's pupil PP on the display unit DP.

The control method of the display device 1 may be a control method of a head mounted display. The control method of the display device 1 may be performed by the above-described control unit.

The detecting of the position of the user's pupil PP may include receiving the infrared light through a transmissive hole TH defined through at least one of a plurality of layers constituting the display unit DP.

The detecting of the position of the user's pupil PP may include receiving the infrared light through a plurality of transmissive holes TH disposed between a plurality of pixels PX in the transmissive region.

The detecting of the position of the user's pupil PP may include receiving the infrared light emitted from a plurality of infrared light sources IFR_L1, IFR_L2, IFR_L3, and IFR_L4, IFR_L5, IFR_L6, IFR_L7 and IFR_L8 disposed for each of a plurality of sub-lenses L11, L12, L13, L14, L21, L22, L23, and L24 using a plurality of infrared cameras IFR_C1, IFR_C2, IFR_C3, IFR_C4, IFR_C5, IFR_C6, IFR_C7, and IFR_C8 disposed to overlap the plurality of transmissive regions TR1, TR2, TR3, TR4, TR5, TR6, TR7, and TR8 on a rear surface DP_RS of the display unit DP.

The displaying of the display image DP_IMG may include magnifying and displaying a magnification of specific regions SP1, SP2, and SP3 positioned in a direction in which the user gazes among the display image DP_IMG based on the position of the user's pupil PP.

However, the control method of the display device 1 is not limited to those described above, and at least some of the operations may be omitted, or at least one or more other operations may be further included with reference to other descriptions of the specification.

Referring further to FIGS. 9 and 13, the position of the user's pupil PP may be detected by the plurality of infrared camera IFR_C1, IFR_C2, IFR_C3, IFR_C4, IFR_C5, IFR_C6, IFR_C7 and IFR_C8 disposed to respectively overlap the plurality of transmissive regions TR1, TR2, TR3, TR4, TR5, TR6, TR7, and TR8 on the rear surface DP_RS of the display unit DP, thereby determining the direction in which the user gazes.

The plurality of transmissive regions TR1, TR2, TR3, TR4, TR5, TR6, TR7, and TR8 may include at least one transmissive hole TH as shown in FIGS. 6 and 8, or may further include a plurality of pixels PX.

In one embodiment, for example, as shown in FIG. 9, when the user gazes the center of the first lens LS1, the infrared light IFR_R reflected from the user's pupil PP is not received by the first to fourth infrared cameras IFR_C1 to IFR_C4, and thus the user's pupil PP may not be detected. In this case, the coordinates of the user's pupil PP may be determined as (0,0).

When the coordinates of the user's pupil PP are determined as (0,0), the display unit DP may display a display image DP_IMG corresponding to the user's coordinates as shown in FIG. 11 on the front surface DP_FS of the display unit DP. As shown in FIGS. 11 and 12, the divided display images DP_IMG11, DP_IMG12, DP_IMG13, and DP_IMG14 of the display image DP_IMG may be adjusted in size and/or magnification so that the center region of the VR image IMG_V determined to as being gazed by the user has the highest image quality.

In such an embodiment, when the user gazes at a region other than the central region of the first lens LS1, the user's pupil PP may be detected by at least one among the first infrared camera IPR_C1 to the fourth infrared camera IPR_C4.

In one embodiment, for example, as shown in FIG. 13, when the user gazes a direction in which the first lens LS1 is positioned, the user's pupil PP may be detected by the first infrared camera IPR_C1. In this case, the coordinates of the user's pupil PP may be determined to be positioned in the first quadrant P1_1 (e.g., (3,1)).

When the coordinates of the user's pupil PP are determined as (3,1), the display unit DP may display a display image DP_IMG corresponding to the user's coordinates on the front surface DP_FS of the display unit DP as shown in FIG. 15. As shown in FIGS. 15 and 16, the divided display images DP_IMG11, DP_IMG12, DP_IMG13, and DP_IMG14 of the display image DP_IMG may be adjusted in size and/or magnification so that the specific region SP1, SP2, and SP3 of the VR image IMG_V determined as being gazed by the user have the highest image quality.

Referring further to FIGS. 17 and 18, the position of the user's pupil PP may be detected with only two infrared cameras IFR_C1 and IFR_C2 per one eye of the user.

In one embodiment, for example, as shown in FIG. 17, only the first infrared camera IFR_C1 and the second infrared camera IFR_C2 may be disposed on the rear surface DP_RS of the display unit DP. As shown in FIG. 18, when the user's pupil PP is positioned in the third quadrant P1_3, the user's pupil PP may be detected through the first infrared camera IPR_C1. In this case, the user's pupil PP may be detected in the second detection region SA_E different from the first detection region SA.

In embodiments of a display panel, a display device, and a control method of the display device according to the invention, infrared light sources and infrared cameras are not disposed between lens and the user's eyes, but are disposed on the lens or on the rear surface of the display unit, thereby implementing a slim thickness.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display unit including a first surface through which light is emitted, a second surface opposite to the first surface, and a plurality of transmissive regions which transmits infrared light incident on the first surface;

a first lens and a second lens disposed on the first surface of the display unit, wherein a plurality of channels, through which the light emitted from the first surface of the display unit passes, is defined in the first lens and the second lens;

a plurality of infrared light sources disposed on the first surface of the display unit, wherein the plurality of infrared light sources emits infrared light; and a plurality of infrared cameras disposed on the second surface of the display unit to overlap the plurality of transmissive regions, wherein the first lens includes a first sub-lens, a second sub-lens, a third sub-lens, and a fourth sub-lens, each of which defines a channel of the plurality of channels, and the plurality of transmissive regions include a first transmissive region overlapping the first sub-lens, a second transmissive region overlapping the second sub-lens, a third transmissive region overlapping the third sub-lens, and a fourth transmissive region overlapping the fourth sub-lens.

2. The display device of claim 1, wherein the plurality of infrared light sources includes a first infrared light source disposed on the first sub-lens, a second infrared light source disposed on the second sub-lens, a third infrared light source disposed on the third sub-lens, and a fourth infrared light source disposed on the fourth sub-lens, and the plurality of infrared cameras includes a first infrared camera overlapping the first transmissive region, a second infrared camera overlapping the second transmissive region, a third infrared camera overlapping the third transmissive region, and a fourth infrared camera overlapping the fourth transmissive region.

3. The display device of claim 2, wherein when a user gazes at a center of the first lens, the infrared light reflected from the user's pupil is not received by the plurality of infrared cameras.

4. The display device of claim 2, wherein when a user gazes in a direction in which the first sub-lens is positioned, the infrared light reflected from the user's pupil is received by the first infrared camera.

5. A display device comprising:

a display unit including a first surface through which light is emitted, a second surface opposite to the first surface, and a plurality of transmissive regions which transmits infrared light incident on the first surface;

a first lens and a second lens disposed on the first surface of the display unit, wherein a plurality of channels, through which the light emitted from the first surface of the display unit passes, is defined in the first lens and the second lens;

a plurality of infrared light sources disposed on the first surface of the display unit, wherein the plurality of infrared light sources emits infrared light; and a plurality of infrared cameras disposed on the second surface of the display unit to overlap the plurality of transmissive regions, wherein each of the first lens and the second lens includes a plurality of sub-lenses corresponding to the plurality of channels, the plurality of infrared cameras and the plurality of transmissive regions are disposed to overlap only some sub-lenses among the plurality of sub-lenses, the first lens includes a first sub-lens, a second sub-lens, a third sub-lens, and a fourth sub-lens each providing the channel, the plurality of transmissive regions includes a first transmissive region overlapping the first sub-lens and a second transmissive region overlapping the second sub-lens, the infrared light source includes a first infrared light source disposed on the first sub-lens and a second infrared light source disposed on the second sub-lens, and the plurality of infrared cameras includes a first infrared camera overlapping the first transmissive region and a second infrared camera overlapping the second transmissive region, wherein when a user gazes in a direction in which the third sub lens is positioned, a user's pupil is detected by the first infrared camera.

* * * * *